US010452224B2

(12) United States Patent
Jang et al.

(10) Patent No.: US 10,452,224 B2
(45) Date of Patent: Oct. 22, 2019

(54) WEARABLE DEVICE AND METHOD FOR CONTROLLING THE SAME

(71) Applicant: LG ELECTRONICS INC., Seoul (KR)

(72) Inventors: Hyungtae Jang, Seoul (KR); Jeongyun Heo, Seoul (KR); Junghoon Chu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 358 days.

(21) Appl. No.: 15/135,419

(22) Filed: Apr. 21, 2016

(65) Prior Publication Data
US 2016/0313869 A1 Oct. 27, 2016

(30) Foreign Application Priority Data

Apr. 23, 2015 (KR) .................. 10-2015-0057456

(51) Int. Cl.
G06F 3/0481 (2013.01)
G06F 3/01 (2006.01)
G06F 3/0488 (2013.01)
G04G 21/08 (2010.01)
G06F 3/038 (2013.01)
G04G 9/00 (2006.01)

(52) U.S. Cl.
CPC ............. *G06F 3/0481* (2013.01); *G04G 9/00* (2013.01); *G04G 21/08* (2013.01); *G06F 3/014* (2013.01); *G06F 3/017* (2013.01); *G06F 3/038* (2013.01); *G06F 3/0488* (2013.01); G06F 2203/0381 (2013.01)

(58) Field of Classification Search
CPC ........ G06F 3/0481; G06F 3/014; G06F 3/017; G06F 3/038; G04G 9/00; G04G 21/08
See application file for complete search history.

(56) References Cited

U.S. PATENT DOCUMENTS

| 8,228,292 B1 | 7/2012 | Ruiz et al. | |
|---|---|---|---|
| 2003/0007420 A1 | 1/2003 | Shteyn | |
| 2012/0092383 A1 | 4/2012 | Hysek et al. | |
| 2015/0346694 A1* | 12/2015 | Hoobler | G04G 9/00 368/223 |
| 2016/0085397 A1* | 3/2016 | Jain | G06F 3/0488 715/828 |
| 2016/0179353 A1* | 6/2016 | Iskander | G06F 3/04847 715/765 |

OTHER PUBLICATIONS

European Patent Office Application Serial No. 16166318.2, Search Report dated Sep. 6, 2016, 9 pages.
Motorola, "Moto 360: user's guide", XP055297812, 20 pages.

* cited by examiner

Primary Examiner — Roland J Casillas
(74) Attorney, Agent, or Firm — Lee, Hong, Degerman, Kang & Waimey PC

(57) ABSTRACT

A smart watch operatively connectable to a mobile terminal is disclosed. The smart watch includes a display unit configured to display a watch image and a controller configured to control the display unit to reduce the watch image when a preset event occurs and display notification information in an empty space of the display unit formed by reducing the watch image.

12 Claims, 34 Drawing Sheets

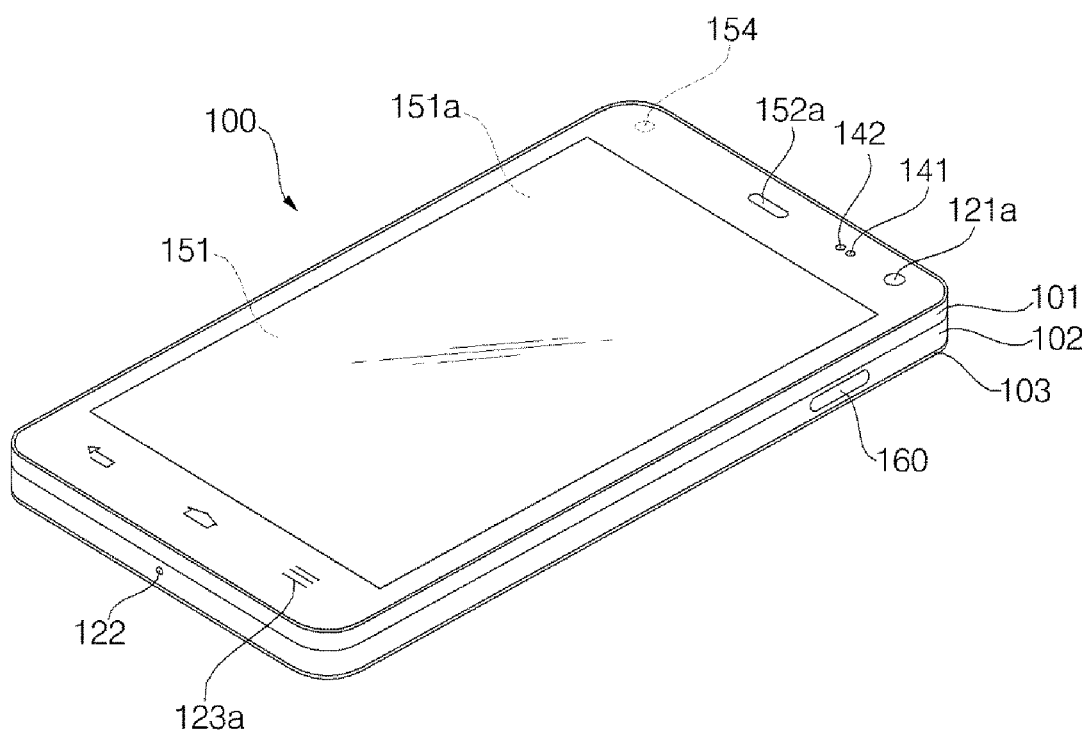

FIG. 24
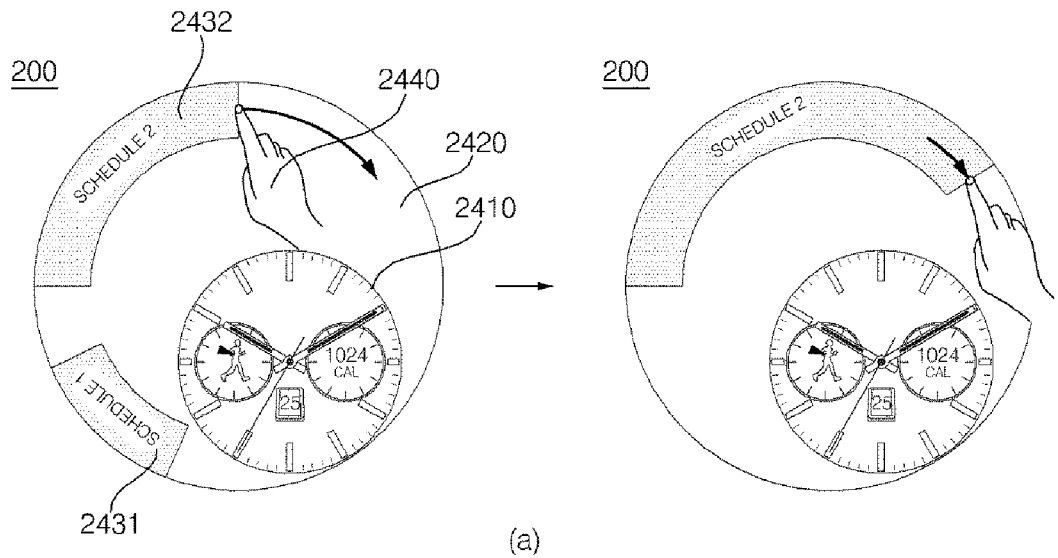
(a)
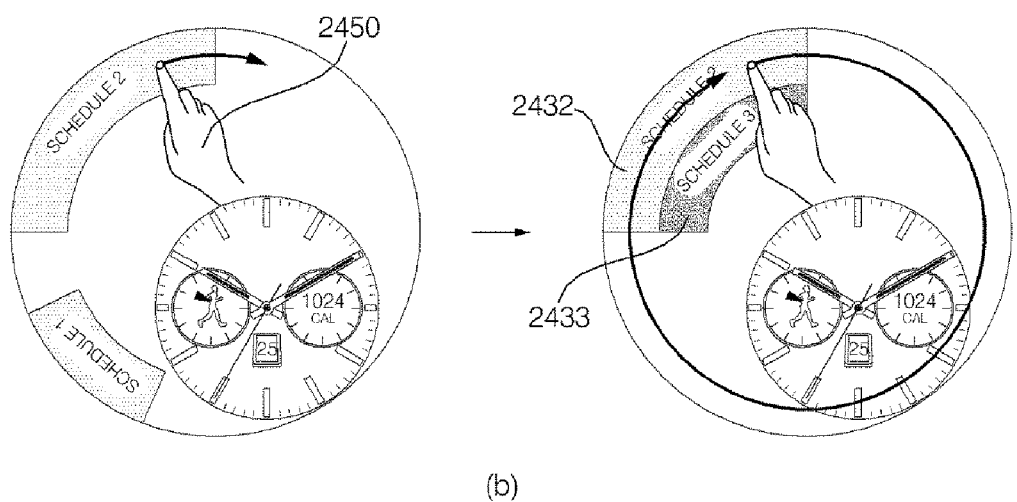
(b)

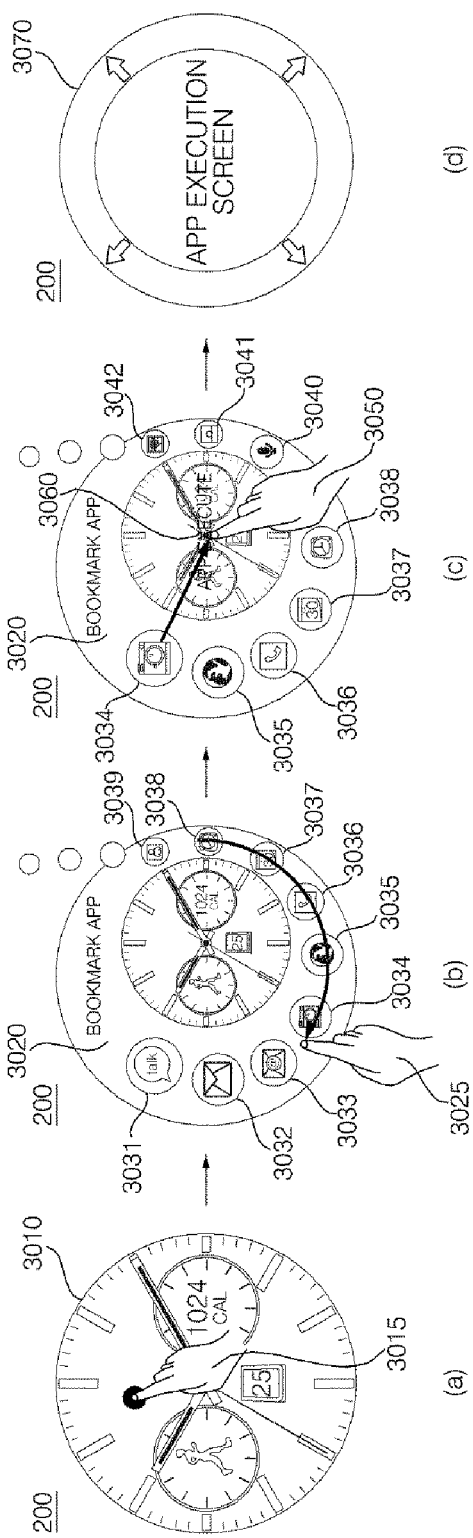

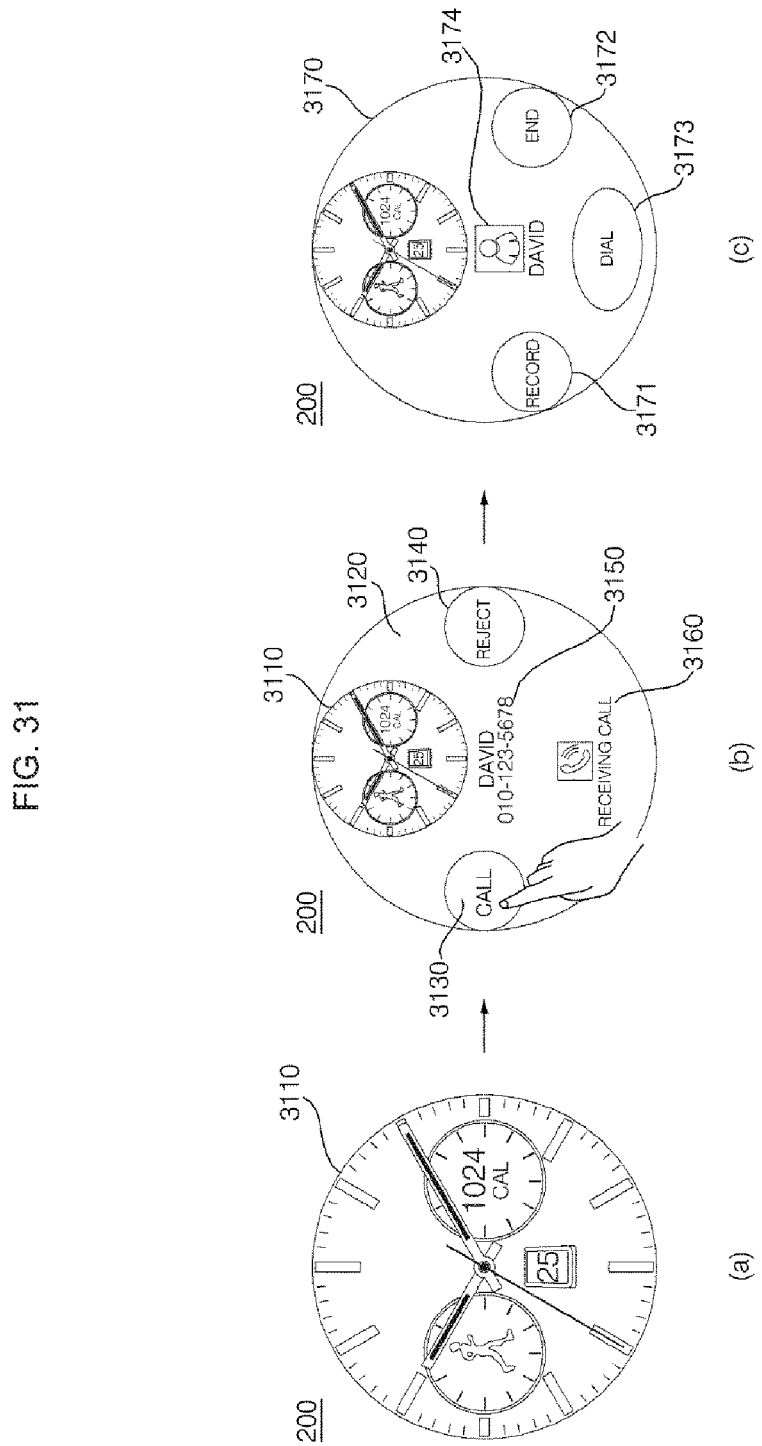

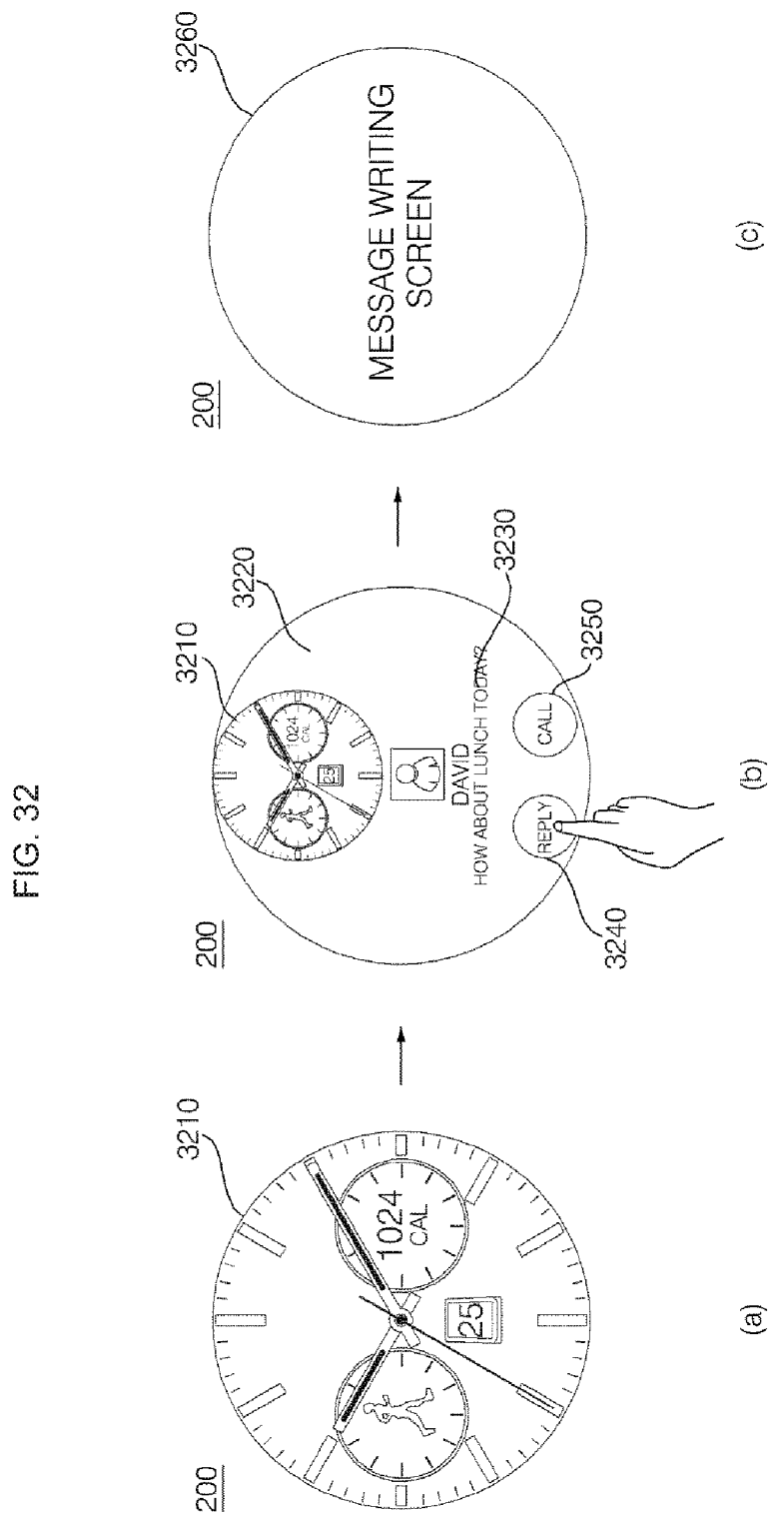

WEARABLE DEVICE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2015-0057456, filed on Apr. 23, 2015 in Korea, the contents of which are hereby incorporated by reference herein in its entirety.

BACKGROUND OF THE INVENTION

1. Field of the Disclosure

The present invention relates to a wearable device and a method for controlling the same, and more particularly, to a wearable device and a method for controlling the same, for providing predetermined notification information in a surrounding region of a watch image when a notification event occurs.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, various types of wearable devices that are operatively connectable to a mobile terminal, such as a smart watch, smart glasses, a head mounted display (HMD), and a smart ring have been developed, thereby enhancing user convenience.

In particular, a smart watch has been developed to output a unique analog watch image on a circular display so as to feel like a real watch.

However, a conventional smart watch arbitrarily displays various notification information items on a watch screen when a notification event occurs, and thus a user does not feel exactly like a real watch and also legibility is reduced with respect to notification information and time information. Accordingly, there is a definite need for a method for effectively outputting various notification information items on a circular watch screen of a smart watch.

SUMMARY OF THE DISCLOSURE

Accordingly, an object of the present invention is to address the above-noted and other problems.

Another object of the present invention is to provide a watch-type wearable device and a method for controlling the same, for outputting various notification information items in an empty space of a display unit, which is formed by changing a size of a watch image and/or moving the watch image.

To achieve these and other advantages and in accordance with the purpose of the present invention, as embodied and broadly described herein, the present invention provides in one aspect a smart watch including a display unit configured to display a watch image, and a controller configured to control the display unit to reduce the watch image when a preset event occurs and display notification information in an empty space of the display unit formed by reducing the watch image.

In another aspect, the present invention provides a method for controlling a smart watch, the method including displaying a watch image on a display unit; reducing the watch image when a preset event occurs; and displaying notification information in an empty space of a display unit formed by reducing the watch image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 1b and 1c are conceptual views of one example of the mobile terminal, viewed from different directions;

FIG. 24 is a diagram for explanation of an operation of a smart watch for performing a predetermined edit function based on a drag input of a user during a moving circle mode;

FIG. 30 is a diagram for explaining an operation of a smart watch that enters a moving circle mode and provides app icons registered as bookmarks in response to a long touch input;

FIG. 31 is a diagram for explaining an operation of a smart watch that provides a call screen including a watch image when receiving a call; and FIG. 32 is a diagram for explaining an operation of a smart watch that provides a message screen including a watch image during message reception.

DETAILED DESCRIPTION OF THE PREFERRED EMBODIMENTS

Figure 1A:
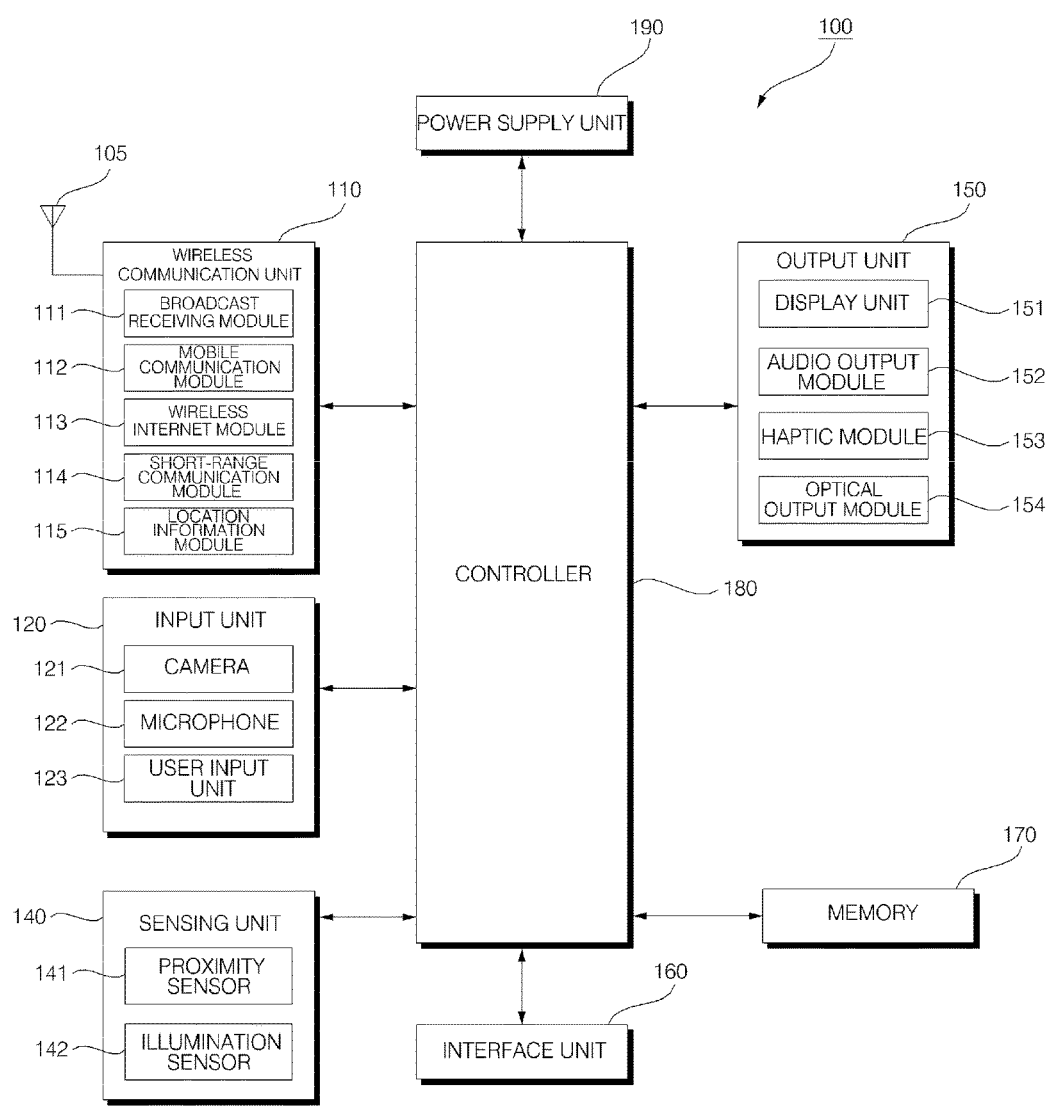
FIG. 1a is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

[[US Start]]

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

[[US End]]

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
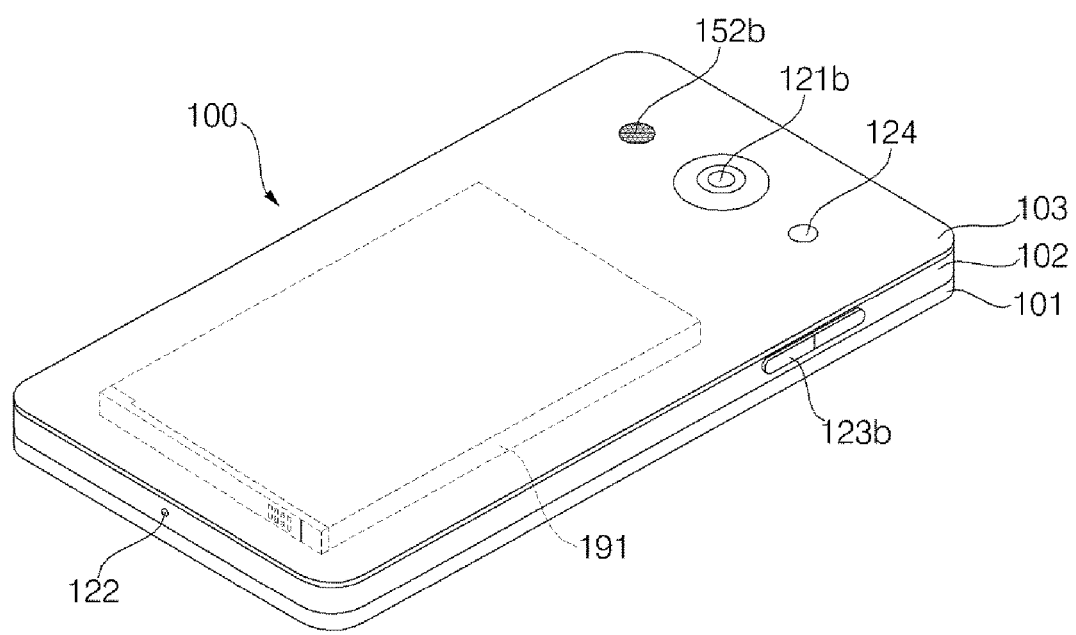

With reference to FIG. 1a to 1c, FIG. 1a is a block diagram for explanation of a mobile terminal 100 associated with the present invention. FIGS. 1b and 1c are conceptual diagrams illustrating an example of the mobile terminal 100 viewed from different directions, associated with the present invention.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

[[UX Part Start]]

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating use authority of the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

[[UX Part End]]

[[Wearable Start]]

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

[[Watch Start]]

Figure 2:
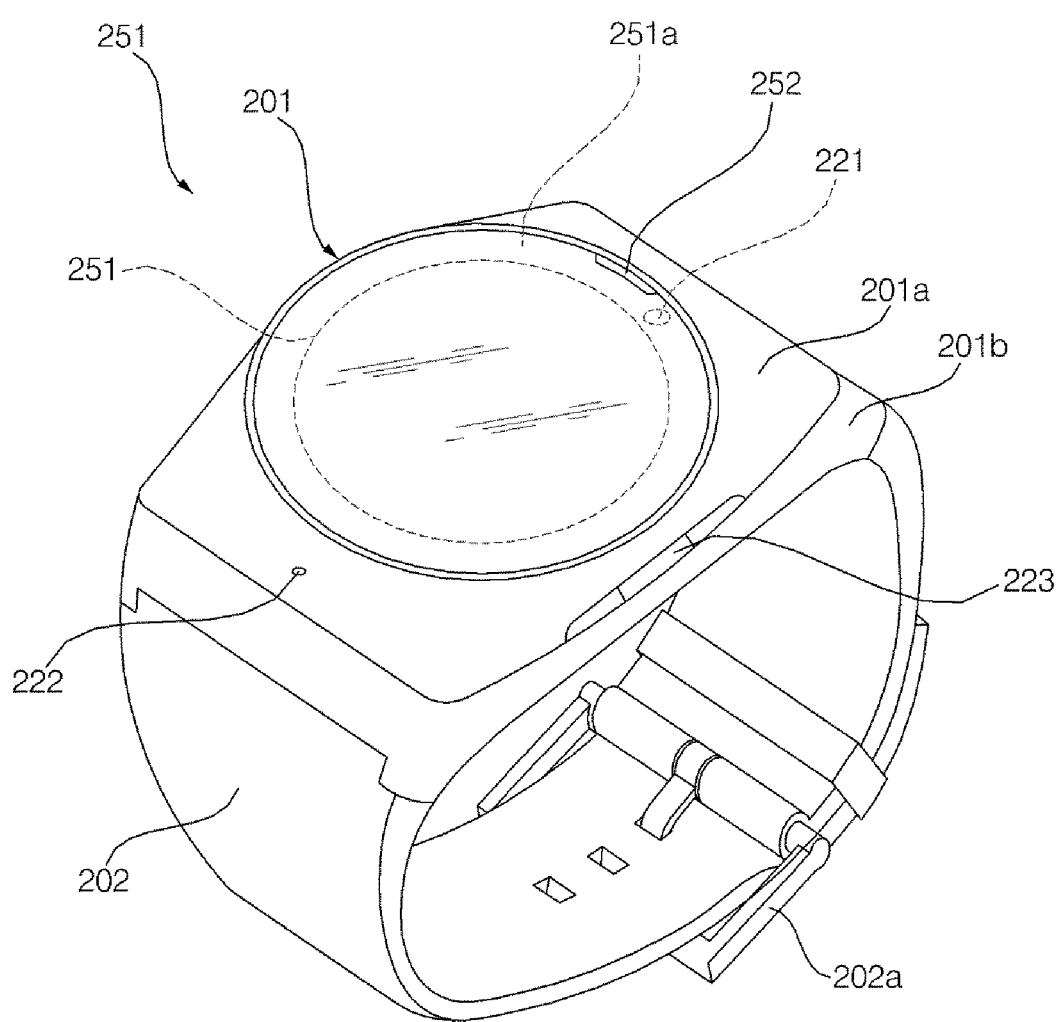
FIG. 2 is a perspective view illustrating one example of a watch-type mobile terminal in accordance with another exemplary embodiment.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on the wrist. In general, mobile terminal 200 may be configured to include features that are the same or similar to that of mobile terminal 100 of FIGS. 1a-1c.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

[[Watch End]]
[[Wearable End]]

Further preferred embodiments will be described in more detail with reference to additional drawing figures. It is understood by those skilled in the art that the present features can be embodied in several forms without departing from the characteristics thereof.

Figure 3:
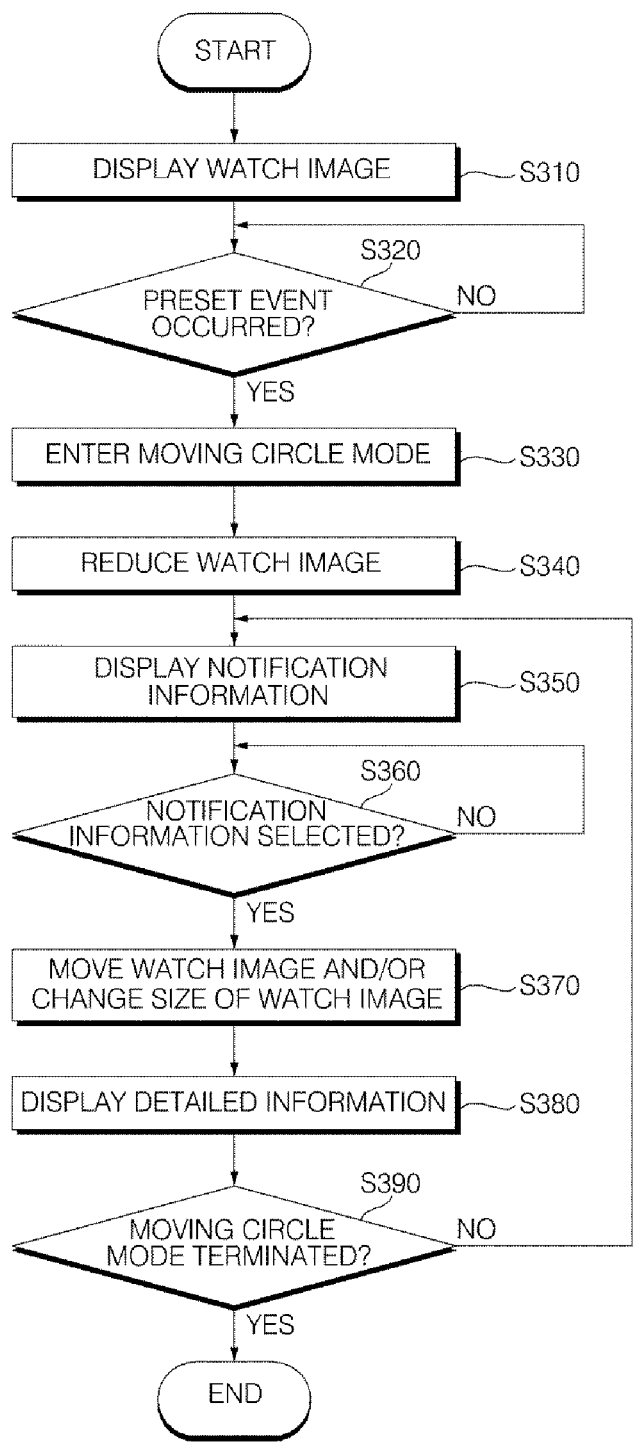
FIG. 3 is a flowchart for explaining an operation of a smart watch according to an exemplary embodiment of the present invention.

FIG. 3 is a flowchart for explanation of an operation of a smart watch 200 according to an exemplary embodiment of the present invention.

Referring to FIG. 3, a controller 280 of the smart watch 200 may display a watch image set as an initial image on the display unit 251 according to a user command or the like (S310). In this case, the watch image displayed on the display unit 251 may be a digital watch image or an analog watch image.

During display of the watch image, when a preset event has occurred (S320), the controller 280 may enter a moving circle mode (S330). Hereinafter, the 'moving circle mode' stated in the specification may refers to an operation mode for displaying notification information in an empty space of the display unit 251 created by adjusting the size and/or position of the watch image.

The preset event for entering the moving circle mode may be a gesture input of shaking or flicking the wrist by a user or a gesture input of touching and dragging a main body of a smart watch or tapping the main body of the smart watch a predetermined number of times. In addition, the preset event may be a notification event that occurs in the smart watch 200.

During entry into the moving circle mode, the controller 280 may reduce the watch image with a predetermined ratio and display the reduced watch image on the display unit 251 (S340). In this case, the controller 280 may display the reduced watch image on a central portion of the display unit 251 or at an edge of the display unit 251.

The controller 280 may display various notification information items in the empty space on the display unit 251, which is formed by reducing the watch image (S350). The notification information items displayed in the empty space of the display unit 251 may include, without being limited to, schedule information, message/email/message reception notification information, missed call notification information, battery related notification information, update related notification information, and so on.

When any one of the notification information items displayed in a surrounding region of the watch image is selected (S360), the controller 280 may change the size of the watch image according to the amount of information to be displayed in the empty space of the display unit 251 (S370).

For example, when the watch image is positioned at the edge of the display unit 251, the controller 280 may change the size of the watch image according to the amount of detailed information about the selected notification information. When the watch image is positioned in the central portion of the display unit 251, the controller 280 may move the watch image to the edge of the display unit 251, and simultaneously or sequentially change the size of the watch image according to the amount of detailed information about the selected notification information.

The controller 280 may display detailed information about the selected notification information in the empty space of the display unit 251, which is enlarged by moving the watch image and/or changing the size of the watch image (S380). Accordingly, the smart watch 200 may effectively display various notification information items without obstructing display of the watch image.

Then when a preset event for terminating the moving circle mode occurs (S390), the controller 280 may enlarge the reduced watch image and display the original watch image on the display unit 251.

When the preset event for termination of the moving circle mode does not occur (S390), the controller 280 may repeatedly perform the aforementioned operations 350 to 380. Here, the preset event may be a gesture input of shaking or flicking the wrist by a user or a gesture input of touching and dragging a main body of a smart watch or tapping the main body of the smart watch a predetermined number of times. In addition, the preset event may be a check complete event for completing a checking process of all notification information items displayed on the display unit 251.

As described above, a smart watch according to an embodiment of the present invention may output various notification information items in an empty space of a display unit, which is formed by changing the size of a watch image and moving the watch image, thereby enhancing readability for notification and time information as well as allowing the smart watch to feel like a real watch.

Figure 4:
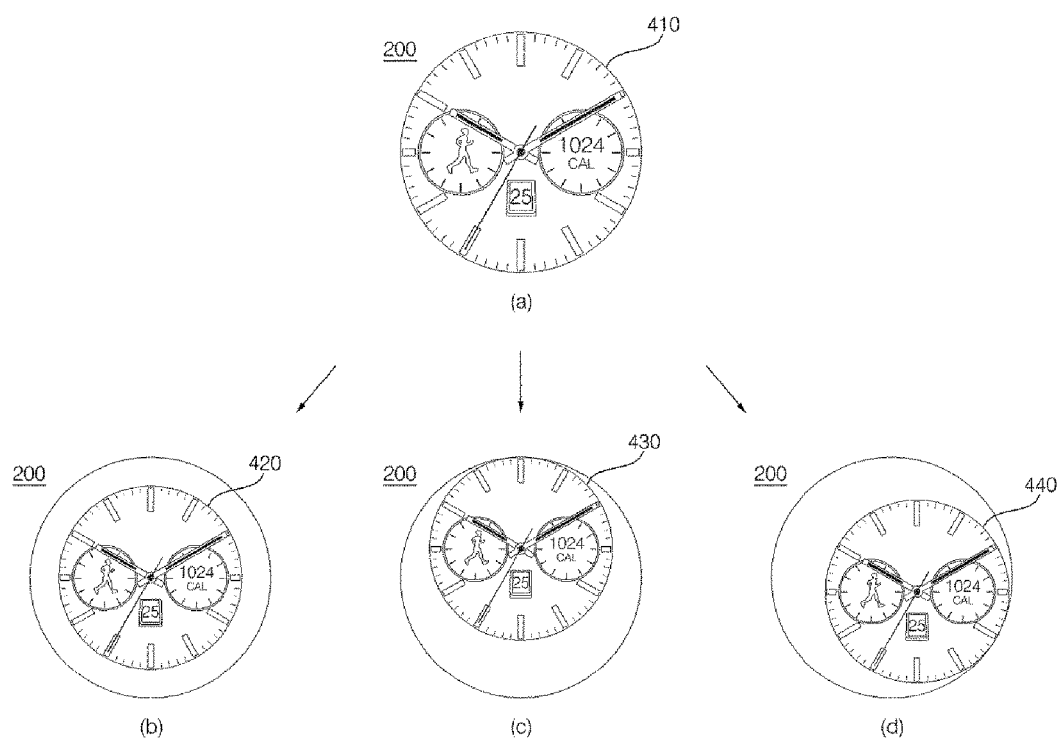
FIGS. 4 and 5 are diagrams for explaining an operation of a smart watch that reduces a watch image and displays the reduced watch image at various positions of a display unit when entering a moving circle mode.
Figure 5:
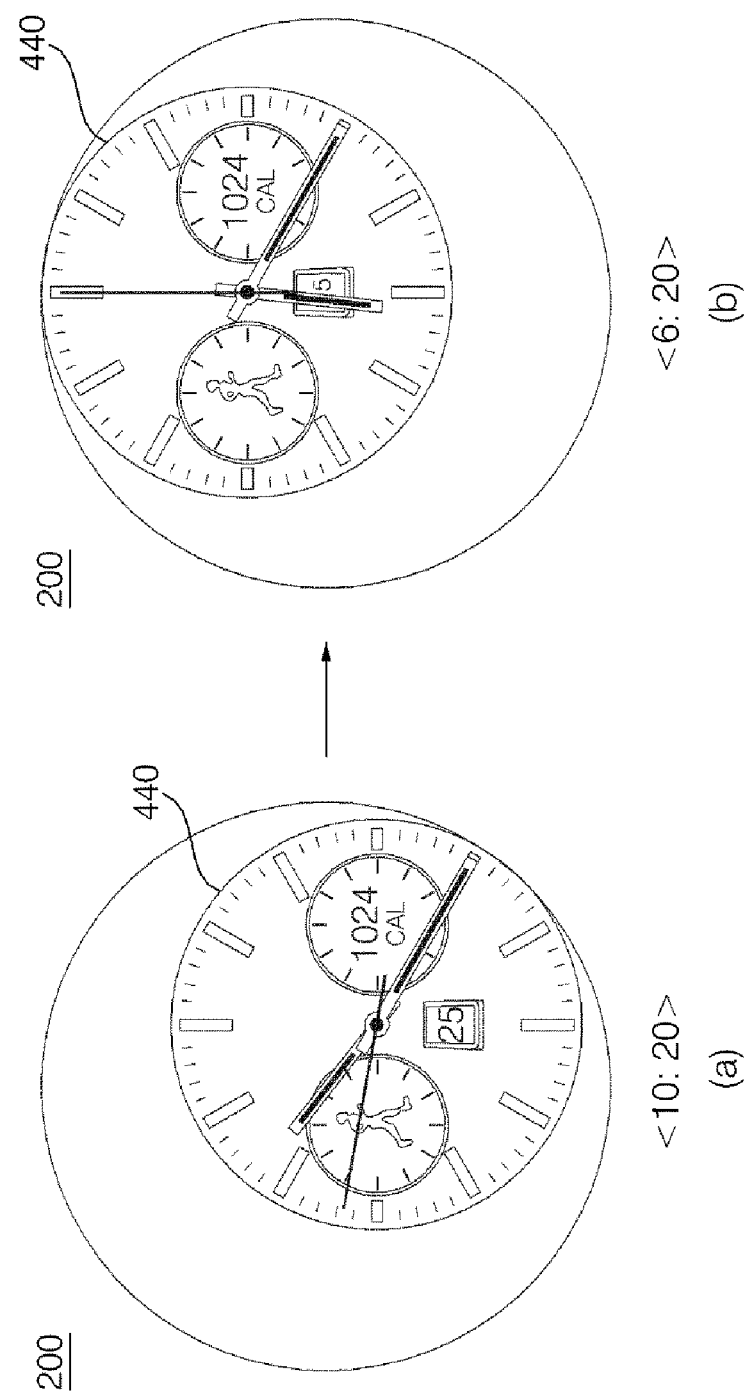

FIGS. 4 and 5 are diagrams for explaining an operation of a smart watch that reduces a watch image and displays the reduced watch image at various positions of a display unit when entering a moving circle mode.

Referring to FIG. 4, the smart watch 200 may display a watch image 410 on the display unit 251 according to a user command or the like.

During display of the watch image 410, if a preset event for entry into a moving circle mode has occurred, the smart watch 200 may reduce the watch image and display the reduced watch image on the display unit 251. In this case, the smart watch 200 may display the reduced watch image in a central portion or an edge of the display unit 251.

For example, as illustrated in (b) of FIG. 4, the smart watch 200 may display a reduced watch image 420 in the central portion of the display unit 251. Accordingly, various notification items may be displayed in an empty space formed between the reduced watch image 420 and the edge of the display unit 251.

As illustrated in (c) of FIG. 4, the smart watch 200 may display a reduced watch image 430 in a predetermined edge region (e.g., an edge region in the 12 o'clock direction) of a display unit. Accordingly, various notification information items may be displayed in the empty space formed between the reduced watch image 430 and the edge of the display unit 251.

As illustrated in (d) of FIG. 4, the smart watch 200 may move a reduced watch image 440 in an opposite direction to a direction in which an hour hand is directed to display the reduced watch image 440 at an edge of the display unit 251. On the other hand, the smart watch 200 may move a reduced watch image (not shown) in a direction in which an hour hand is directed to display the reduced watch image at the edge of the display unit 251. Accordingly, various notification information items may be displayed in an empty space formed between the reduced watch image 440 and the edge of the display unit 251.

In addition, when the reduced watch image 440 is displayed at the edge of the display unit 251, the smart watch 200 may be configured to move the reduced watch image 440 in a clockwise direction as time goes by, as illustrated in FIG. 5.

Figure 6:
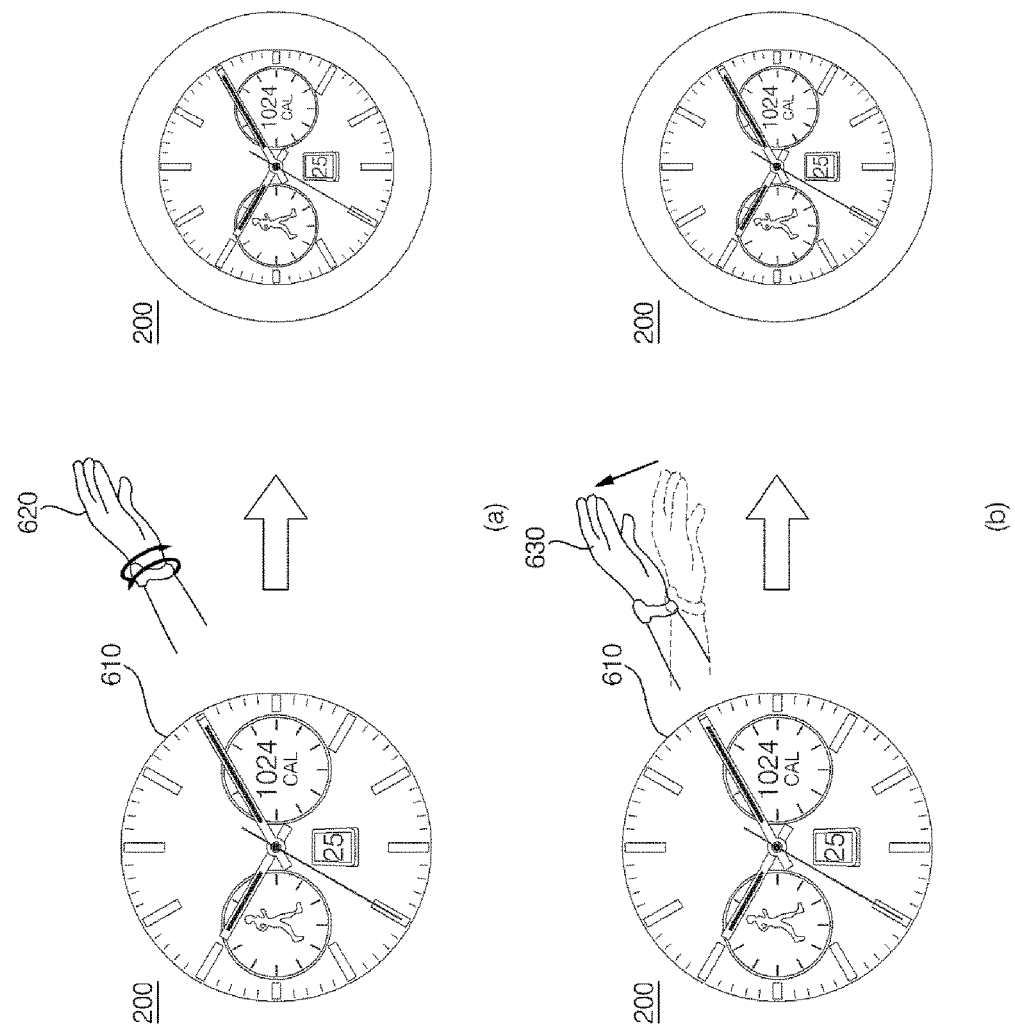
FIGS. 6 to 8 are diagrams for explaining various methods for entering a moving circle mode in a smart watch according to the present invention.
Figure 7:
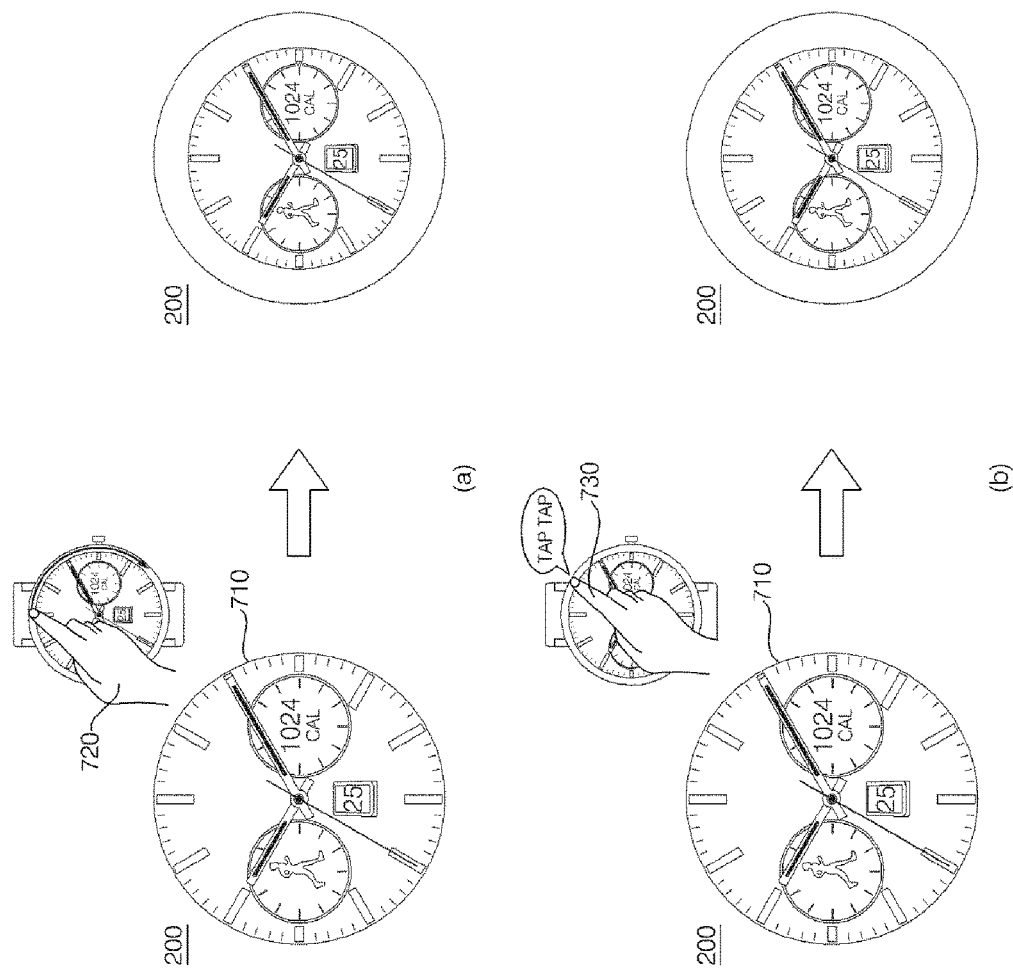
Figure 8:
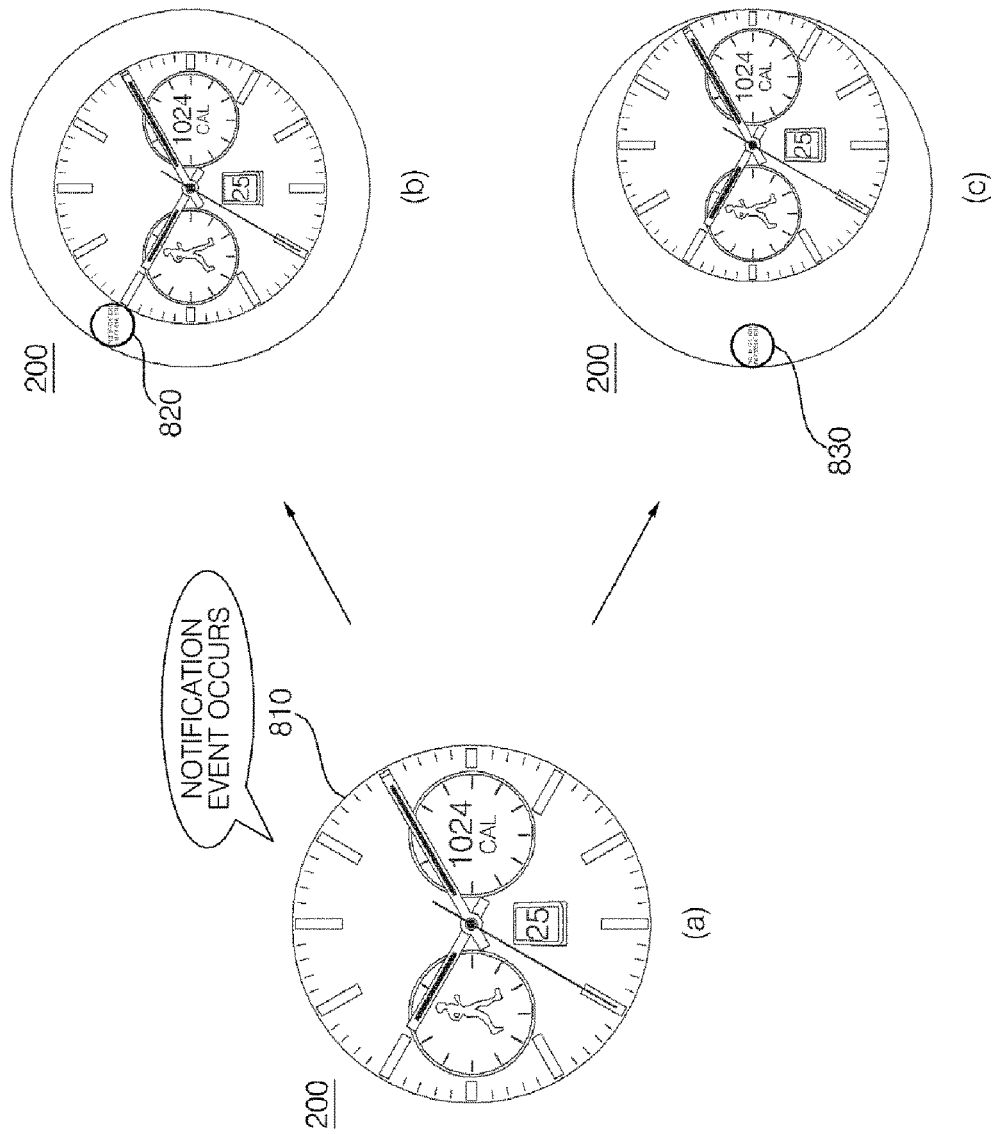

FIGS. 6 to 8 are diagrams for explaining various methods for entering a moving circle mode in a smart watch according to the present invention.

Referring to FIG. 6, the smart watch 200 may display a watch image 610 in the display unit 251 according to a user command or the like.

During display of the watch image 610, upon receiving a gesture input of moving the wrist that wears the smart watch 200 according to a predetermined pattern, the smart watch 200 may enter a moving circle mode in order to effectively display predetermined notification information.

For example, as illustrated in (a) and (b) of FIG. 6, upon receiving a gesture input 620 of swing the writ or a gesture input 630 of flicking the wrist, the smart watch 200 may enter a moving circle mode. It will be apparent to those skilled in the art that the smart watch 200 may enter a moving circle mode using various gesture inputs other than the illustrated gesture inputs 620 and 630. A type of the gesture input may be preset and stored by a user or set by default via a manufacturer of a mobile terminal.

According to another embodiment of the present invention, referring to FIG. 7, during display of a watch image 710 on the display unit 251, upon receiving a preset gesture input through a main body of the smart watch 200, the smart watch 200 may enter a moving circle mode for effectively displaying predetermined notification information.

For example, as illustrated in (a) and (b) of FIG. 7, upon receiving a gesture input 720 of touching and dragging a bezel portion of a main body 201 or a gesture input 730 of tapping a portion of the main body 201a predetermined number of times, the smart watch 200 may enter a moving circle mode. It will be apparent to those skilled in the art that the smart watch 200 may enter a moving circle mode using various gesture inputs other than the illustrated gesture inputs 720 and 730.

According to another embodiment of the present invention, referring to FIG. 8, when a preset notification event occurs while a watch image 810 is displayed on the display unit 251, the smart watch 200 may automatically enter a moving circle mode without a separate user input. Accordingly, the smart watch 200 may reduce a watch image, display the reduced watch image in a central portion or an edge portion of a display, and display notification information in a surrounding region of the reduced watch image. In this case, a type of a notification event that occurs in the smart watch may include, without being limited to, a schedule notification event, a message/email/message reception event, a missed call event, a battery related notification event, an update related notification event, and so on.

Notification information displayed in the empty space of the display unit 251 may be configured in such a way that a display position of the notification information varies according to occurrence time of a corresponding notification event. For example, as illustrated in (b) of FIG. 8, when a notification event occurs at 10:10, the smart watch 200 may display notification information 820 in an empty space of a display, corresponding to occurrence time of the notification event. When the same type of notification event occurs several times, the smart watch 200 may display notification information based on occurrence time of a notification event that has most recently occurred.

In addition, the notification information displayed in the empty space of the display unit 251 may be configured in such a way that a display position of the notification information varies according to a type of a corresponding notification event. For example, as illustrated in (c) of FIG. 8, when an occurring notification event is a 'message reception event', the smart watch 200 may display notification information 830 at a predetermined position (e.g., in the 9 o'clock direction) according to a type of the notification event. In this case, a menu for pre-determining a display position of notification information corresponding to a type of a notification event may be provided.

Figure 9:
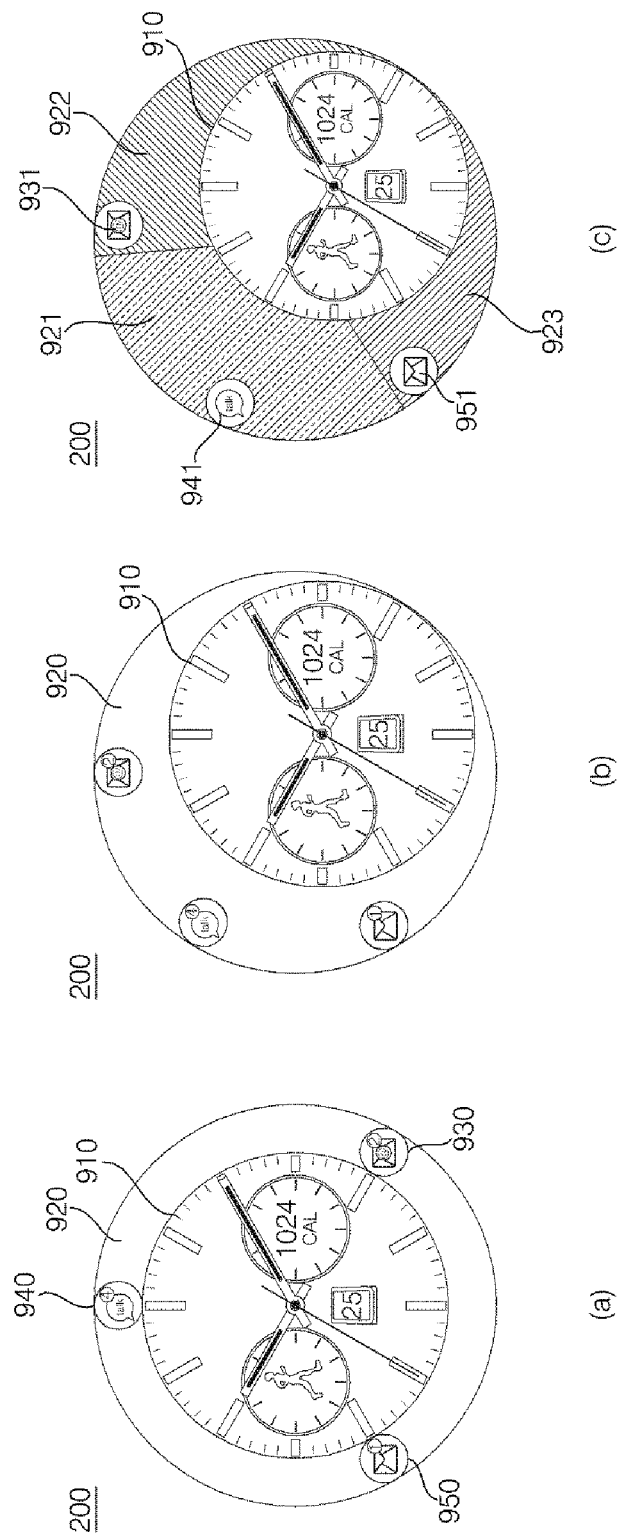
FIG. 9 is a diagram for explaining an operation of a smart watch that displays predetermined notification information in various ways according to occurrence of a notification event during a moving circle mode.

FIG. 9 is a diagram for explaining an operation of a smart watch that displays predetermined notification information in various ways according to occurrence of a notification event during a moving circle mode.

Referring to FIG. 9, upon entering a moving circle mode, the smart watch 200 may reduce a watch image 910 and display the reduced watch image 910 in a central portion or an edge region of the display unit 251.

In this state, when an email reception event, a messenger reception event, and a message reception event simultaneously or sequentially occur, the smart watch 200 may display notification information items (i.e., notification icons 930 to 950) corresponding to corresponding notification events in a surrounding region 920 of the watch image 910.

In this case, the notification information items displayed in the display unit 251 may be sequentially arranged according to an occurrence order of the notification events. In addition, the notification information items displayed in the display unit 251 may be displayed in various forms such as an icon image, a text image, or a combination of an icon image and a text image.

Meanwhile, as illustrated in (c) of FIG. 9, the smart watch 200 may divide the surrounding region 920 of the watch image 910 into three regions 921, 922, and 923 corresponding to a type of notification information and display the three division regions with different colors. In this case, a color displayed in the respective division region may be configured to correspond to the type of notification information. In addition, areas occupied by the respective division region may be configured to correspond to a number of the corresponding notification information items.

In addition, the smart watch 200 may display indicators 931, 941, and 951 indicating the type of notification information in the three division regions respectively.

As such, when notification information displayed in various manners is touched and dragged along an empty space 920 of the display unit 251, the smart watch 200 may vary a display position of corresponding notification information according to the touch and drag input. In addition, when the watch image 910 is touched and dragged in a display region of the display unit 251, the smart watch 200 may vary a display position of the corresponding watch image 910 according to the touch and drag input of the user. In this case, according to change in a position of the watch image 910, the display position of notification information may be varied.

Figure 10:
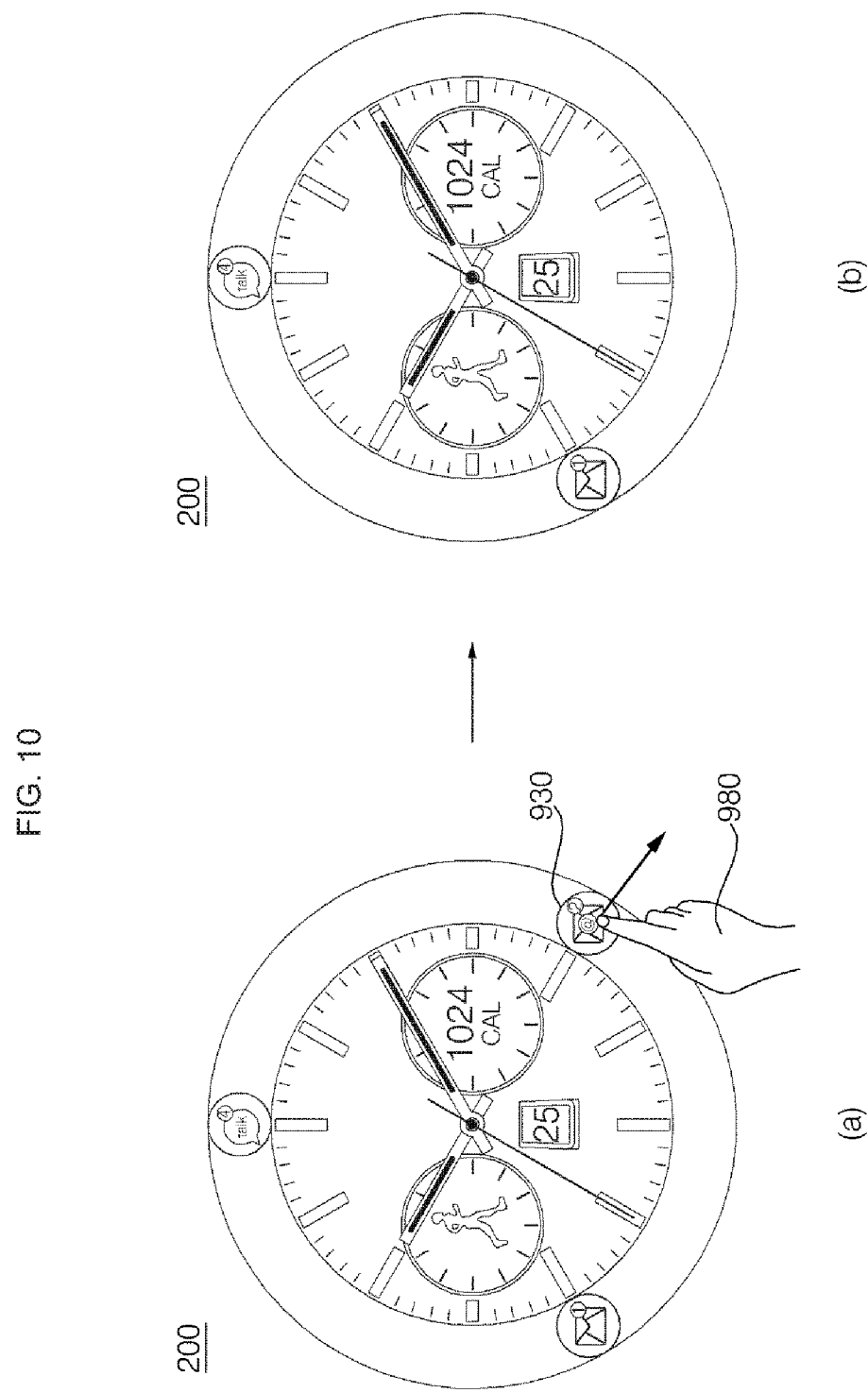
FIG. 10 is a diagram for explaining an operation of a smart watch that removes notification information displayed in an empty space of a display unit during a moving circle mode.

As illustrated in FIG. 10, upon receiving a user input 980 for flicking (or touching and dragging) specific notification information 930 toward an edge of the display unit 251, the smart watch 200 may remove the corresponding notification information 930 from the empty space of the display unit 251.

FIGS. 11 to 14 are diagrams for explaining an operation of a smart watch that displays detailed information about selected notification information in various ways during a moving circle mode.

Figure 11:
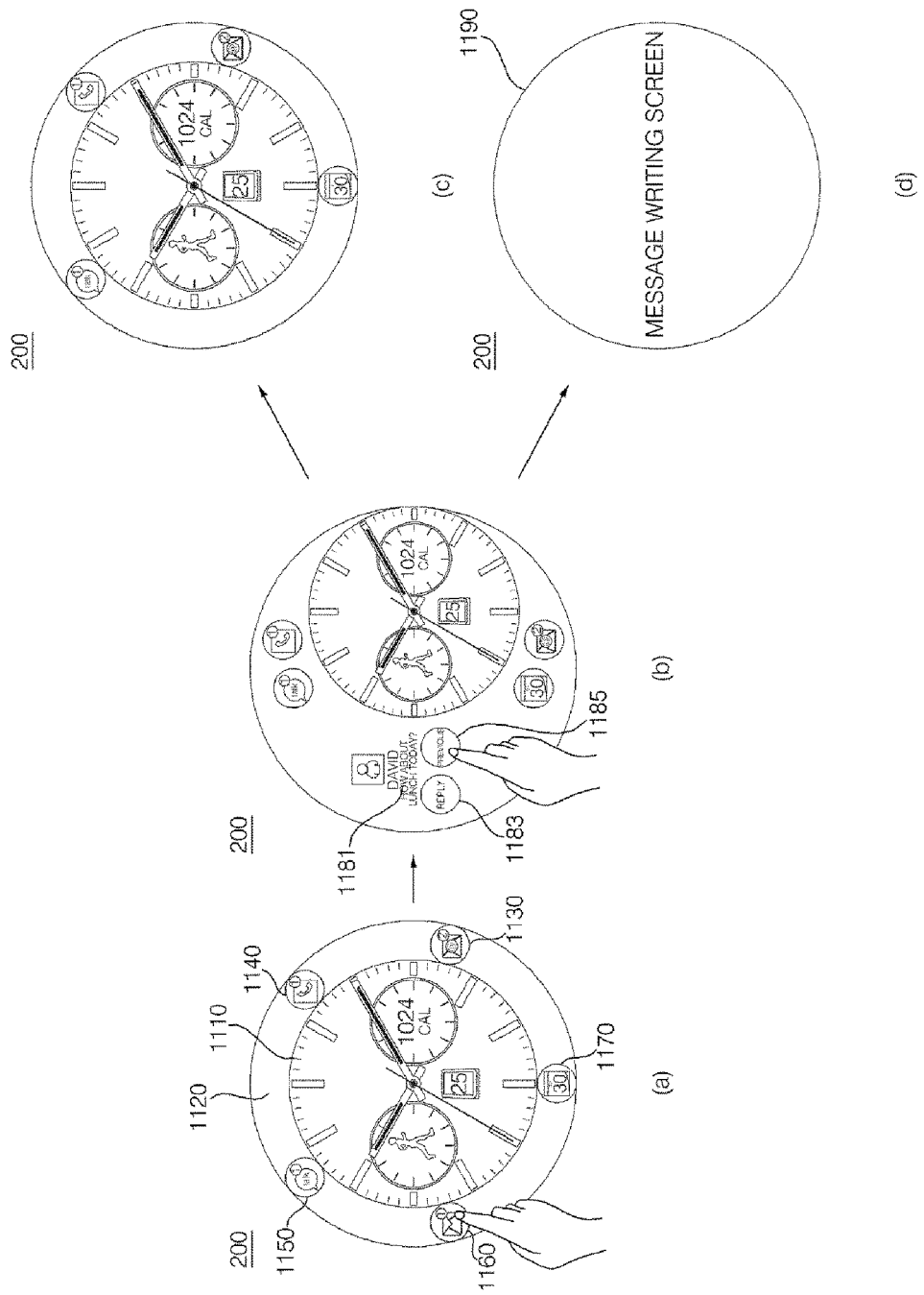
FIGS. 11 to 14 are diagrams for explaining an operation of a smart watch that displays detailed information about selected notification information in various ways during a moving circle mode.

Referring to FIG. 11, the smart watch 200 may display a plurality of notification information items 1130 to 1170 in a surrounding region 1120 of a watch image 1110 during a moving circle mode. In this case, the notification information items may be displayed in the form of an icon.

Upon selecting first notification information 1160 among the notification information items 1130 to 1170, the smart watch 200 may move the watch image 1110 toward an edge of the display unit 251, and simultaneously or sequentially change the size of the watch image 1110 according to the amount of detailed information about the first notification information 1160.

The smart watch 200 may display detailed information 1181 about the first notification information 1160 in the surrounding region 1120 of the display unit 251, which is enlarged by moving the watch image 1110 and changing the size of the watch image 1110.

In addition, the smart watch 200 may display an execution icon 1183 for execution of an operation associated with the first notification information 1160 and a previous icon 1185 for movement to a previous operation mode in the surrounding region 1120 of a display. For example, according to the embodiment of the present invention, when the first notification information 1160 is reception message notification information, the information 1181 of a reception message, the answer icon 1183, the previous icon 1185, and so on may be displayed in an empty space of the enlarged display unit 251.

Upon selecting the previous icon 1185 displayed in the surrounding region 1120 of the display unit 251, the smart watch 200 may move the watch image 1110 toward a central portion of the watch image 1110 and may simultaneously restore the watch image 1110 to an original size, as illustrated in (c) of FIG. 11. In addition, the smart watch 200 may remove the first notification information 1160 checked by a user from the surrounding region 1120 of the watch image 1110.

Upon selecting the answer icon 1183 displayed in the surrounding region 1120 of the display unit 251, the smart watch 200 may execute a message application corresponding to the first notification information 1160 to display a message writing screen 1190 on the display unit 251, as illustrated in (d) of FIG. 11.

Figure 12:
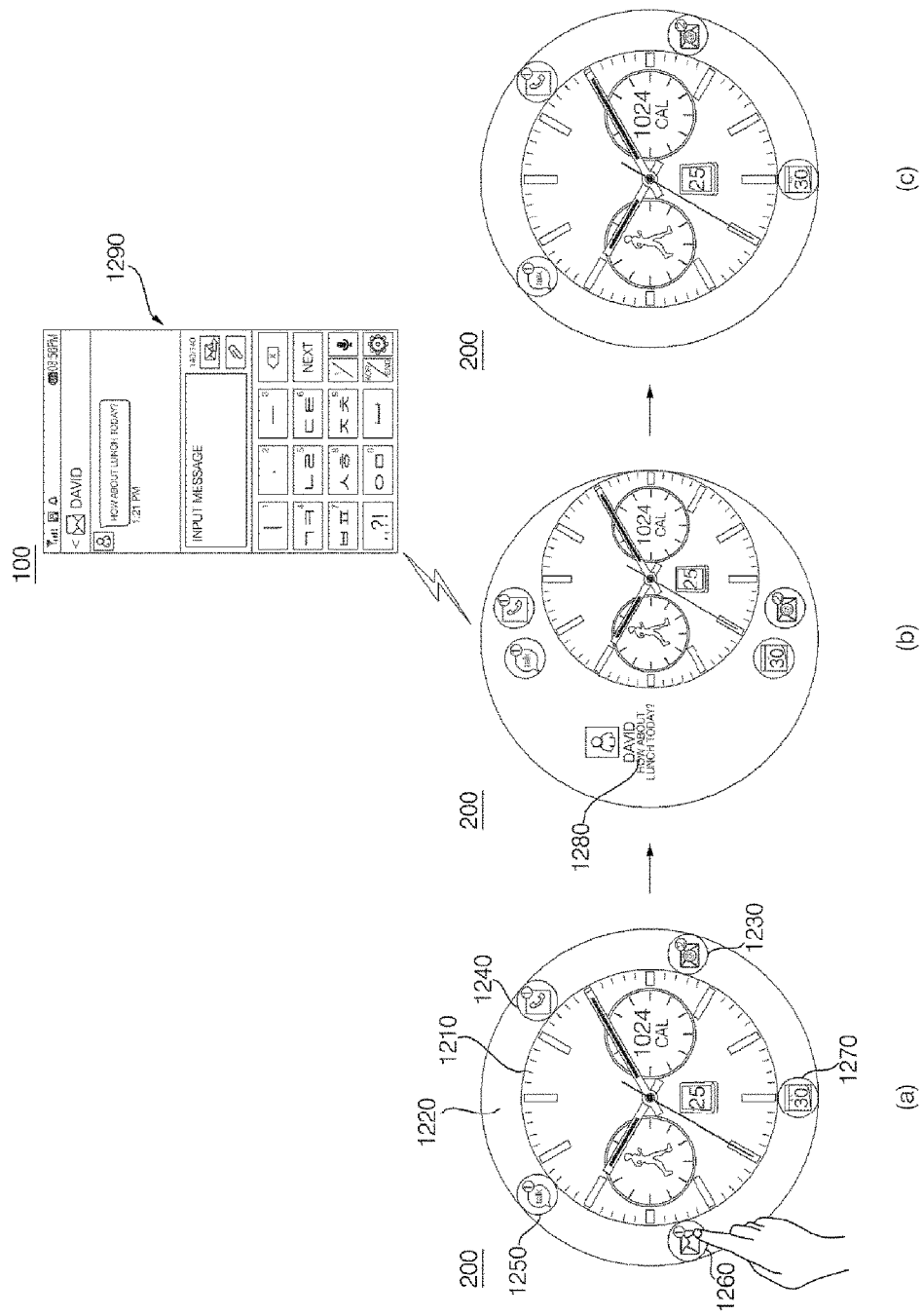

According to another embodiment of the present invention, referring to FIG. 12, upon selecting first notification information 1260 among a plurality of notification information items 1230 to 1270 displayed in a surrounding region 1220 of a watch image 1210, the smart watch 200 may move the watch image 1210 toward an edge of the display unit 251 and may simultaneously or sequentially change the size of the watch image 1210 according to the amount of detailed information of the first notification information 1260.

The smart watch 200 may display detailed information 1280 about the first notification information 1260 in an empty space 1220 of the display unit 251, which is enlarged by moving the watch image 1210 and changing the size of the watch image 1210. Accordingly, a user of the smart watch 200 may check content of the first notification information 1260 through the detailed information 1280.

When the detailed information 1280 of the first notification information 1260 is checked, the smart watch 200 may transmit a control signal to an associated mobile terminal 100 so as to allow a user to perform an operation associated with the first notification information 1260 through the mobile terminal 100. The mobile terminal 100 that receives the control signal from the smart watch 200 may display an execution screen (e.g., a message writing screen 1290) of an application corresponding to the first notification information 1260 on the display unit 151.

When a predetermined time elapses after displaying the detailed information 1280 of the first notification information 1260 or a back key and so on are selected, the smart watch 200 may move the watch image 1210 toward a central portion of the display unit 251 and may restore the watch image 1210 to an original size, as illustrated in (c) of FIG. 12. In addition, the smart watch 200 may remove the first notification information 1260 checked by a user from the surrounding region 1220 of the watch image 1210.

Figure 13:
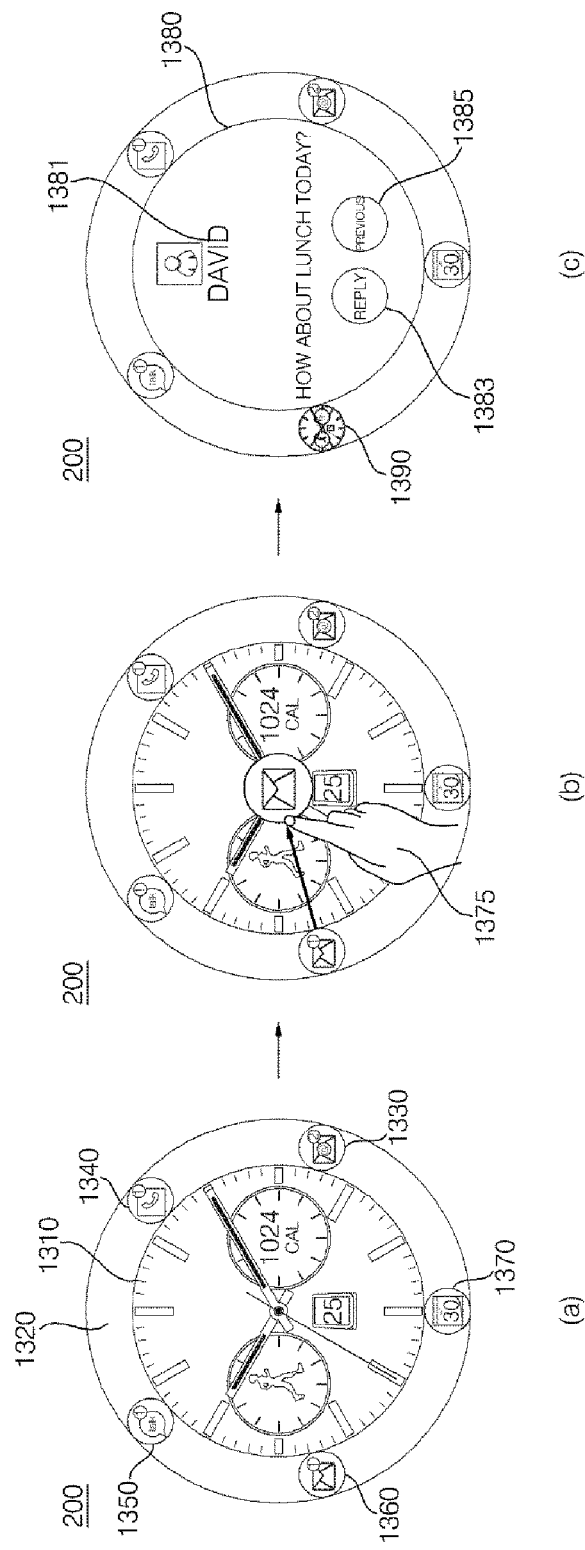

According to another embodiment of the present invention, referring to FIG. 13, the smart watch 200 may display a plurality of notification information items 1330 to 1370 in a surrounding region 1320 of a watch image 1310 in a moving circle mode.

Upon receiving a user input 1375 for touching first notification information 1360 among the notification information items 1330 to 1370 and then dragging the first notification information 1360 into a central direction of the watch image 1310, the smart watch 200 may replace the watch image 1310 with a notification information image 1380 and replace the first notification information 1360 with a reduced watch image (i.e., a watch icon 1390).

In this case, the notification information image 1380 displayed in a central portion of the display unit 251 may include detailed information 1381 about the first notification information 1360, an execution icon 1383 for execution of an operation associated with the first notification information 1360, a previous icon 1385 for movement to a previous operation mode, and so on. An operation of the smart watch 200 according to selection of the execution icon 1383 or the previous icon 1385 is the same as the aforementioned operation of the smart watch illustrated in (c) and (d) of FIG. 11 and a detailed description thereof will thus be omitted.

Figure 14:
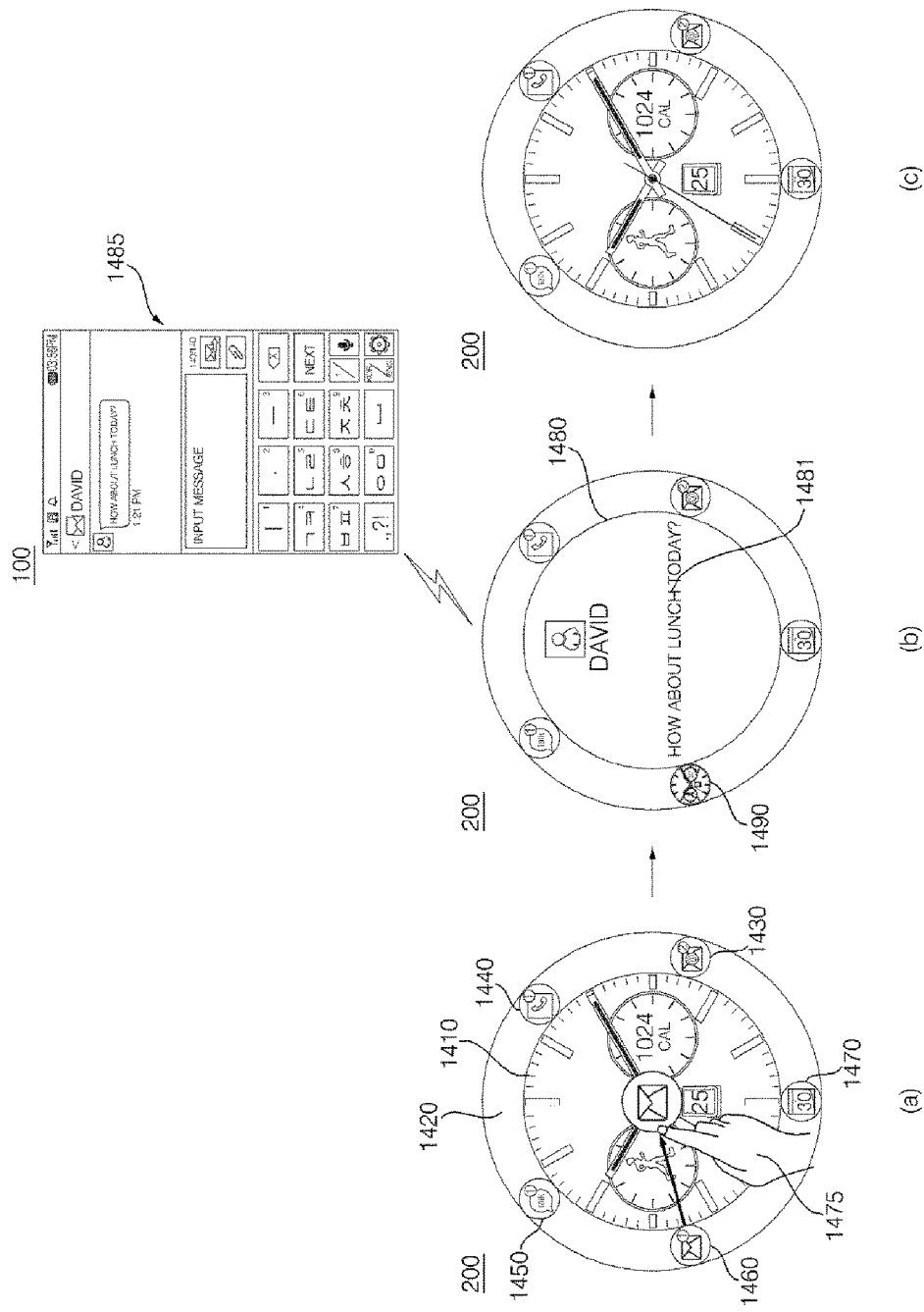

According to another embodiment of the present invention, referring to FIG. 14, upon receiving a user input 1475 of touching first notification information 1460 among a plurality of notification information items 1430 to 1470 and then dragging the first notification information 1460 in a central direction of a watch image 1410, the smart watch 200 may replace the watch image 1410 with a notification information image 1480 and replace the first notification information 1460 with a reduced watch image (i.e., a watch icon 1495).

In this case, the notification information image 1380 displayed in a central portion of the display unit 251 may include detailed information 1481 about the first notification information 1460. Accordingly, a user of the smart watch 200 may check content of the first notification information 1460 through the detailed information 1481.

When the detailed information 1481 of the first notification information 1460 is checked, the smart watch 200 may transmit a control signal to an associated mobile terminal 100 so as to allow a user to perform an operation associated with the first notification information 1460 through the mobile terminal 100. The mobile terminal 100 that receives the control signal from the smart watch 200 may display an execution screen (e.g., a message writing screen 1485) of an application corresponding to the first notification information 1460 in the display unit 151.

When a predetermined time elapses after displaying the detailed information 1481 of the first notification information 1460 or a back key and so on are selected, the smart watch 200 may display the watch image 1410 in the central portion of the display unit 251, as illustrated in (c) of FIG. 14. In addition, the smart watch 200 may remove the first notification information 1460 checked by a user from a surrounding region 1420 of the watch image 1410.

Figure 15:
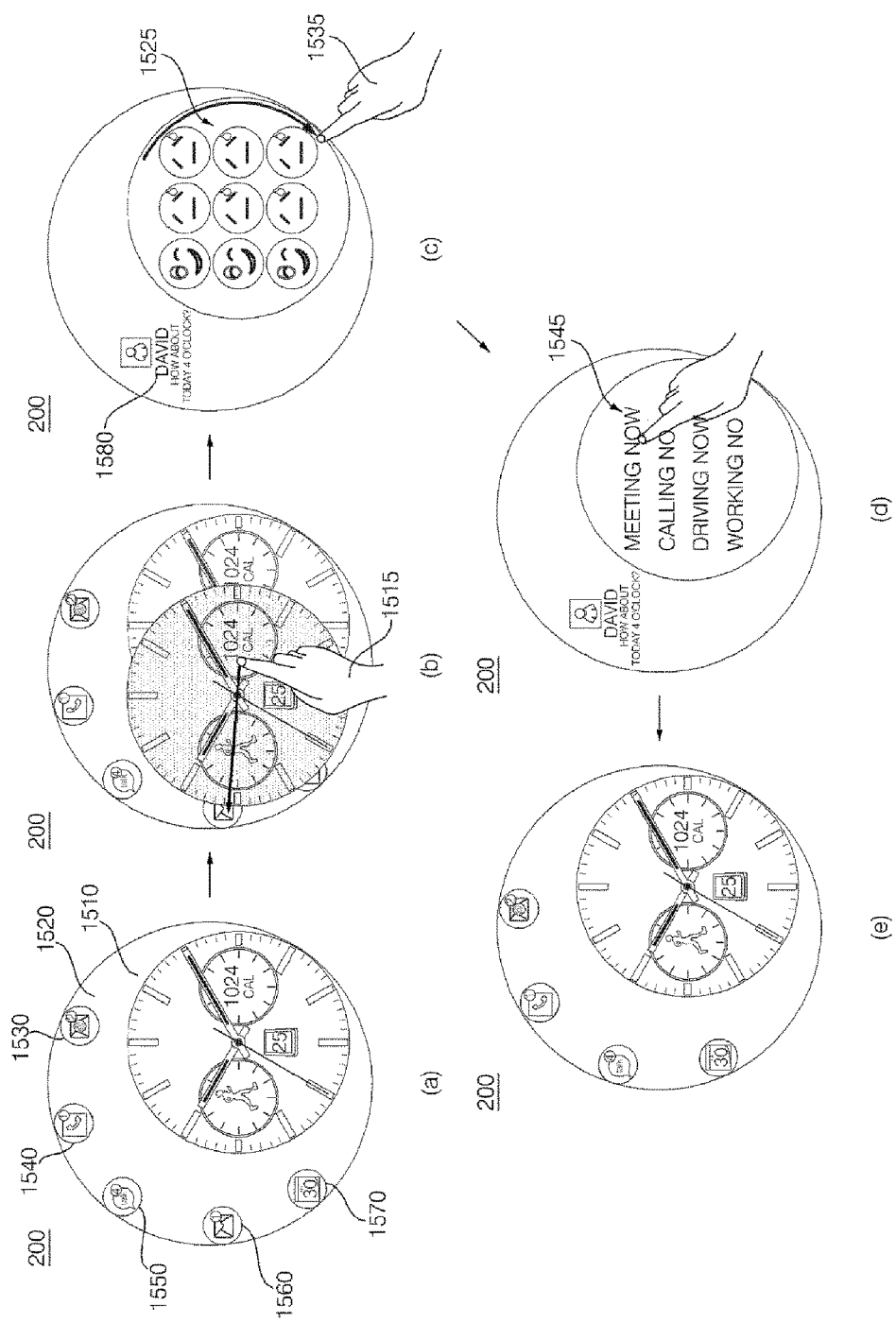
FIGS. 15 to 17 are diagrams for explaining an operation of a smart watch that performs a quick action function according to a preset gesture input during a moving circle mode.
Figure 16:
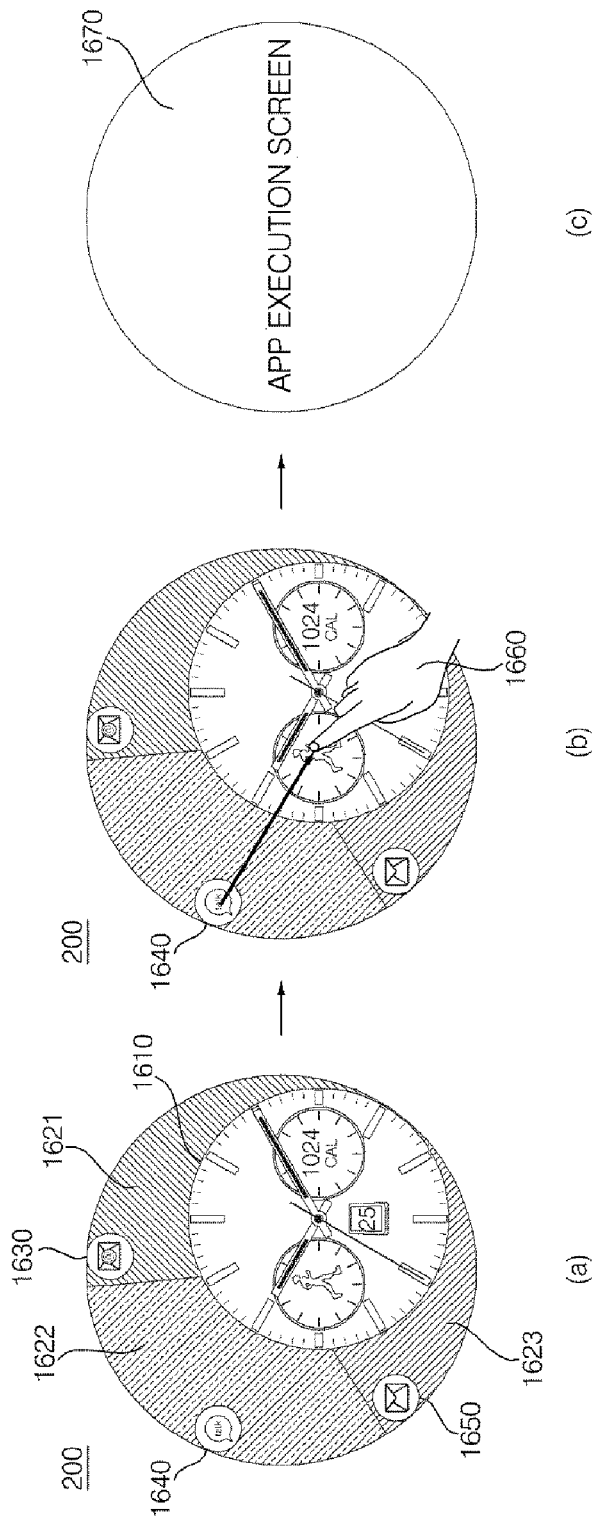
Figure 17:
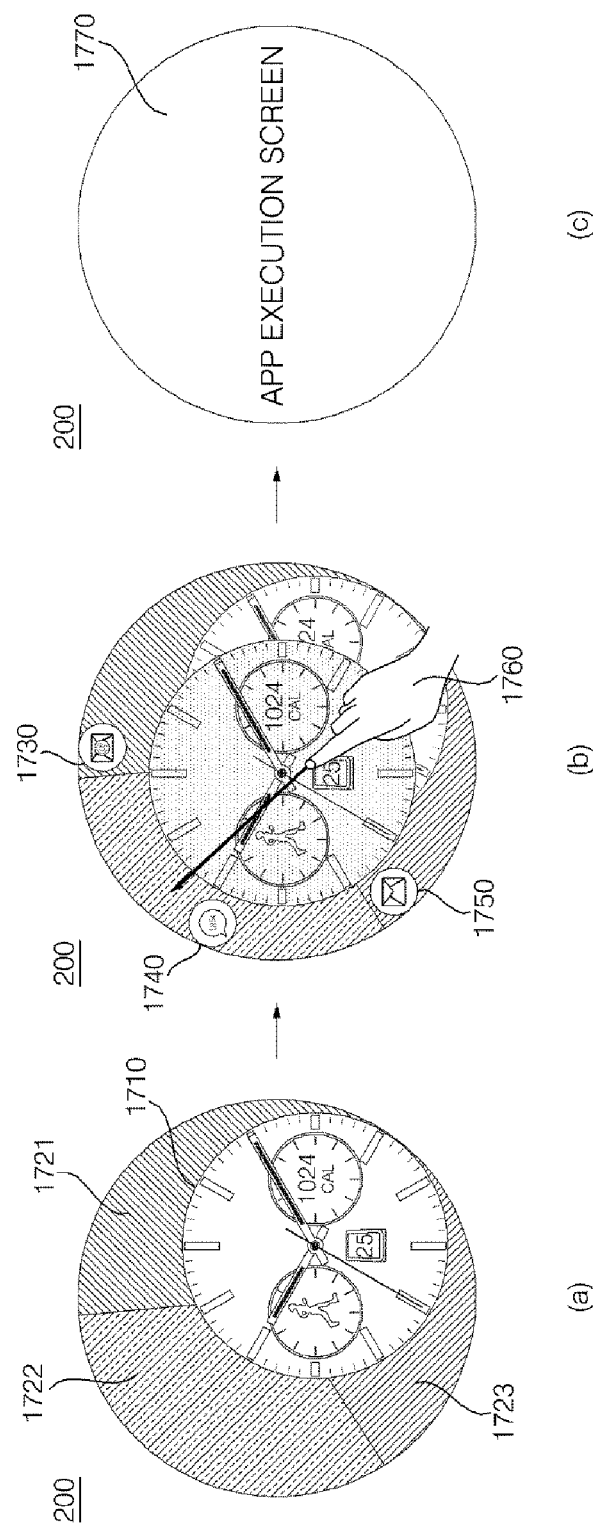

FIGS. 15 to 17 are diagrams for explaining an operation of a smart watch that performs a quick action function according to a preset gesture input during a moving circle mode.

Referring to FIG. 15, the smart watch 200 may display a plurality of notification information items 1530 to 1570 in a surrounding region 1520 of a watch image 1510 in a moving circle mode.

In this state, upon receiving a user input 1515 of touching the watch image 1510 and then dragging the watch image 1510 toward first notification information 1560, the smart watch 200 may display detailed information 1580 about the first notification information 1560 in an empty space 1520 of the display unit 251. In this case, the smart watch 200 may remove the notification icons 1530 to 1570 from the empty space 1520 of a display.

The smart watch 200 may display the watch image 1510 to be transparent/translucent or remove the watch image 1510, and display first icons 1525 for performing a quick action function (or a shortcut function) associated with the first notification information 1560 in a watch region. For example, when first notification information is reception message notification information, the first icons displayed in the watch region may be, but are not limited to, various emoticons.

Upon receiving an input 1535 of touching and dragging along an edge of the watch region or an input (not shown) of flicking the watch region, the smart watch 200 may display second icons 1545 for performing a quick action function associated with the first notification information 1560 in the watch region. In this case, second icons displayed in the watch region may be, but are not limited to, various common words.

When any one of the first or second icons is received, the smart watch 200 may directly perform a quick action function associated with the first notification information 1560 without displaying an execution screen of an application corresponding to the first notification information 1560 on the display unit 251. That is, the smart watch 200 may transmit a message including content corresponding to the selected icon to other mobile terminal without displaying a message writing screen on the display unit 251.

Upon completing the quick action function, the smart watch 200 may re-display the watch image 1510 in a watch region, as illustrated in (e) of FIG. 15. In addition, the smart watch 200 may remove the first notification information 1560 checked by a user from the surrounding region 1520 of the watch image 1510.

According to another embodiment of the present invention, referring to FIG. 16, the smart watch 200 may display a plurality of indicators 1630 to 1650 indicating a type of notification information in a surrounding region of a watch image 1610 during a moving circle mode. In this case, the surrounding region of the watch image 1610 may be divided into three regions 1621, 1622, and 1623 corresponding to respective types of notification information items and the three division regions may be displayed with different colors. In addition, a color displayed in the respective division region may correspond to the respective types of notification information items.

In this state, upon receiving a user input 1660 of touching a first indicator 1640 and then dragging the first indicator 1640 in a central direction of the watch image 1610, the smart watch 200 may directly perform a quick action function associated with notification information corresponding to the first indicator 1640. For example, the smart watch 200 may display an execution screen 1670 of an application corresponding to a type of notification information indicated by the first indicator 1640 on the display unit 251.

According to another embodiment of the present invention, referring to FIG. 17, the smart watch 200 may divide a surrounding region of a watch image 1710 into three regions 1721, 1722, and 1723 corresponding to types of notification information items and the three division regions may be displayed in different colors. Similarly, a color displayed in the respective division region may correspond to the respective types of notification information items.

In this state, when a watch image 1710 is touched, the smart watch 200 may display first to third indicators 1730, 1740, and 1750 indicating types of notification information items in the respective division region. Accordingly, a user of the smart watch 200 may check types of notification information items allocated to the respective division region through the first to third indicators 1730, 1740, and 1750 displayed on a screen.

Then, upon receiving a user input 1760 of dragging the touched watch image 1710 toward the second division region 1722, the smart watch 200 may directly perform a quick action function associated with notification information corresponding to the second indicator 1740. For example, the smart watch 200 may display an execution screen 1770 of an application corresponding to a type of the notification information.

Figure 18:
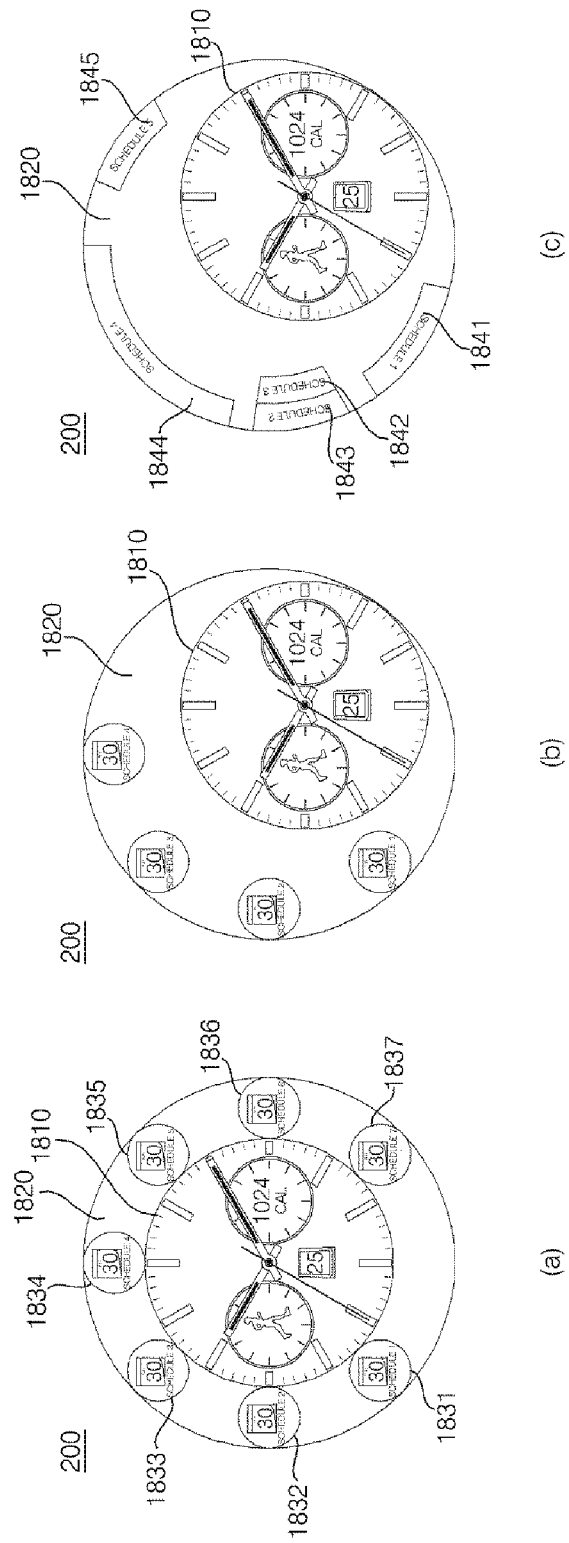
FIG. 18 is a diagram for explaining an operation of a smart watch that displays schedule information of a user in various ways during a moving circle mode.

FIG. 18 is a diagram for explaining an operation of a smart watch that displays schedule information of a user in various ways during a moving circle mode.

Referring to (a) of FIG. 18, when entering a moving circle mode, the smart watch 200 may reduce a watch image 1810 and display the reduced watch image 1810 in a central portion of the display unit 251.

The smart watch 200 may display schedule information items 1831 to 1837 preset by the user in a surrounding region (i.e., an empty space 1820 of a display unit) of the watch image 1810. In this case, schedule information items displayed in the empty space of the display unit 251 may be sequentially arranged according to schedule time.

In addition, the schedule information items displayed in the empty space of the display unit 251 may be configured in such way that a display position of the schedule information varies according to schedule time. For example, when schedule time of second schedule information 1832 is 9 am, the smart watch 200 may display the second schedule information 1832 in the empty space of the display unit 251, which is positioned in the 9 o'clock direction.

According to another embodiment of the present invention, referring to (b) of FIG. 18, when entering a moving circle mode, the smart watch 200 may reduce the watch image 1810 and display the watch image 1810 at an edge region of the display unit 251. In this case, the reduced watch image 1810 may be moved in an opposite direction to a direction in which an hour hand is currently directed and displayed at an edge of the display unit 251.

The smart watch 200 may display the predetermined schedule items 1831 to 1834 pre-set by the user in a surrounding region 1820 of the watch image 1810. Similarly, schedule information may be configured in such a way that display positions of schedule information items displayed in the empty space 1820 of the display unit 251 vary according to schedule time. In addition, the schedule information items displayed in the empty space 1820 of the display unit 251 may be displayed through schedule icons 1831 to 1834 having the same shape and size.

According to another embodiment of the present invention, referring to (c) of FIG. 18, the smart watch 200 may display schedule information items 1841 to 1845 preset by a user in the surrounding region 1820 of the watch image 1810. In this case, schedule information items displayed in the empty space 1820 of the display unit 251 may be displayed through the schedule icons 1841 to 1844, sizes of which vary in proportion to a duration between a start time and an end time of corresponding schedule.

In addition, when there are various schedules in the same/similar time zone, the smart watch 200 may display a corresponding image so as to stack the schedule icons 1842 and 1843 corresponding to respective corresponding schedules.

Figure 19:
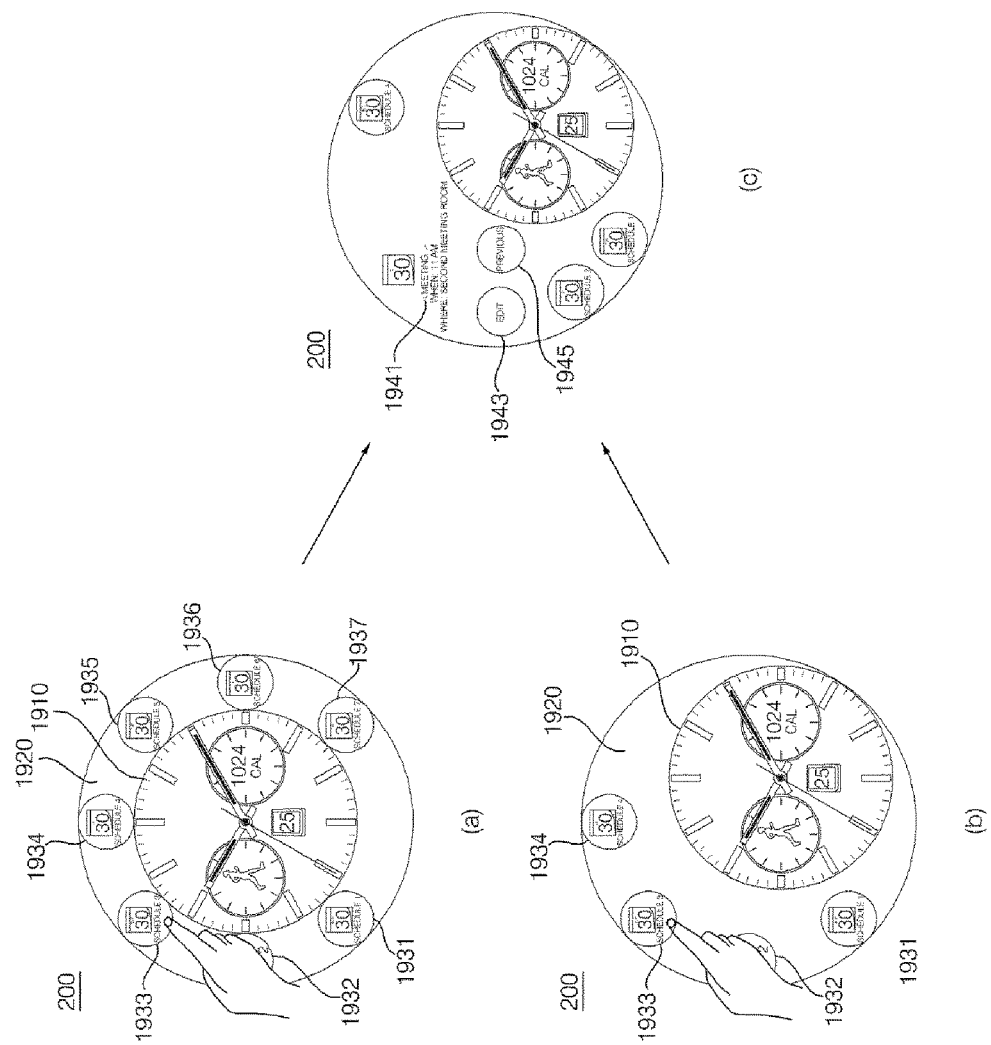
FIG. 19 is a diagram for explaining an operation of a smart watch that displays detailed information about selected schedule information during a moving circle mode.

FIG. 19 is a diagram for explaining an operation of a smart watch that displays detailed information about selected schedule information during a moving circle mode.

Referring to FIG. 19, the smart watch 200 may display a plurality of schedule information items 1931 to 1937 in a surrounding region 1920 of a watch image 1910 during a moving circle mode.

As illustrated in (a) of FIG. 19, when third schedule information 1933 is selected among the schedule information items 1931 to 1937 while the watch image 1910 is displayed in a central portion of a display unit 251, the smart watch 200 may move the watch image 1910 toward an edge of the display unit 251, and simultaneously or sequentially change the size of the watch image 1910 according to the amount of detailed information about the third schedule information 1933.

Meanwhile, as illustrated in (b) of FIG. 19, when the third schedule information 1933 is selected among a plurality of schedule information items 1931 to 1934 while the watch image 1910 is displayed in an edge of the display unit, the smart watch 200 may change the size of the watch image 1910 according to the amount of detailed information about the third schedule information 1933.

The smart watch 200 may display detailed information 1941 about the third schedule information 1933 in an empty space 1920 of the display unit 251, which is enlarged by moving the watch image 1910 and/or changing the size of the watch image 1910.

In addition, the smart watch 200 may display an edit icon 1943 for editing the third schedule information 1933 and a previous icon 1945 for movement to a previous operating mode in the empty space 1920 of the display unit.

When the previous icon 1945 displayed in the empty space 1920 of the display unit 251 is selected, the smart watch 200 may restore the watch image 1910 to an original position and/or size. In addition, the smart watch 200 may display a corresponding image so as to remove the third schedule information 1933 checked by a user from the surrounding region 1920 of the watch image 1910.

When the edit icon 1943 displayed in the empty space 1920 of the display unit 251 is selected, the smart watch 200 may display a schedule edit image (not shown) on the display unit 251. Accordingly, the user may edit third schedule information through the schedule edit image.

Figure 20:
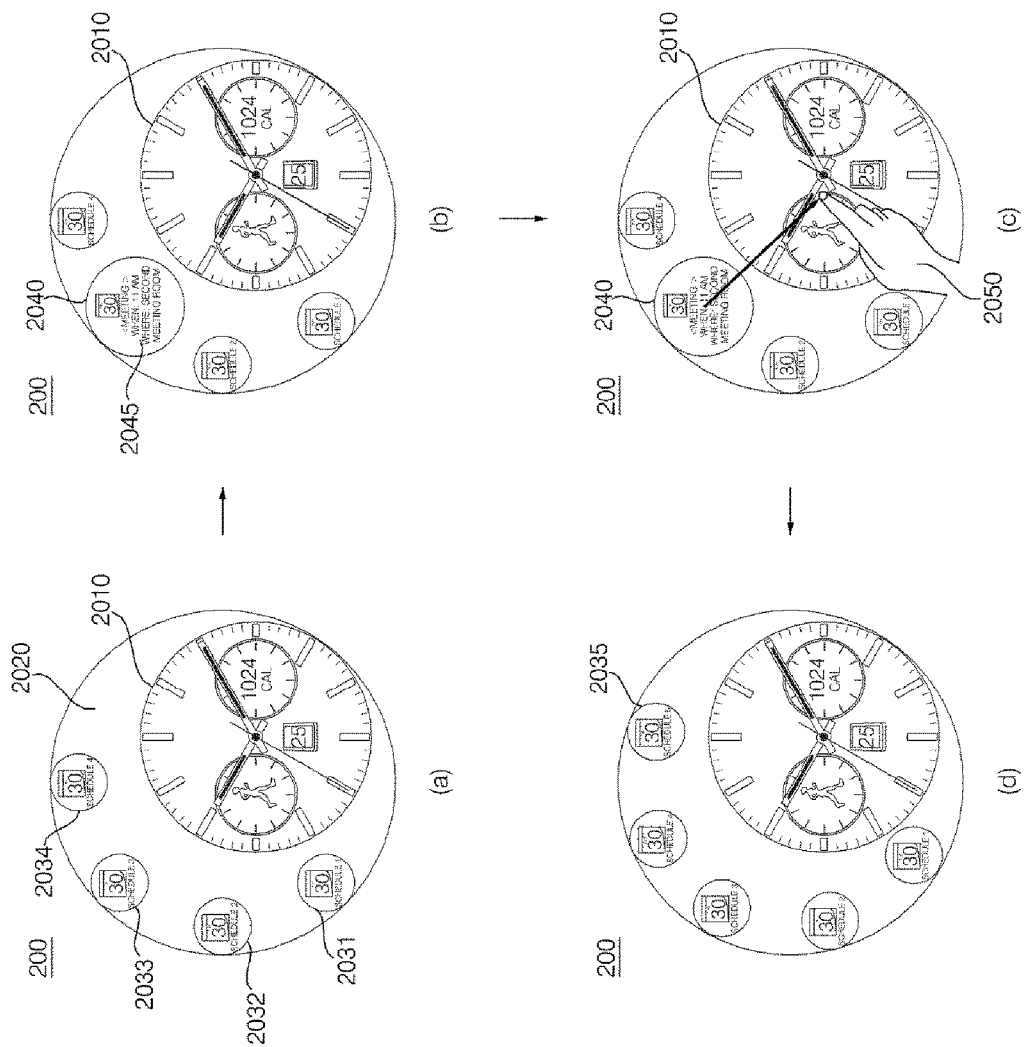
FIG. 20 is a diagram for explaining an operation of a smart watch that performs a reminder function for upcoming schedule information during a moving circle mode.

FIG. 20 is a diagram for explaining an operation of a smart watch that performs a reminder function for upcoming schedule information during a moving circle mode.

Referring to FIG. 20, the smart watch 200 may display a plurality of schedule information items 2031 to 2034 in a surrounding region 2020 of a watch image 2010 during a moving circle mode.

When a predetermined time (e.g., 5 minutes) ahead of schedule time of third schedule information 2033 is reached, the smart watch 200 may perform a reminder function for the third schedule information 2033.

For example, the smart watch 200 may enlarge a size of a display region corresponding to the third schedule information 2033 and display detailed information 2045 about the third schedule information 2033 in the enlarged display region 2040. In this case, the smart watch 200 may change the size of the watch image 2010 according to the amount of detailed information about the third schedule information 2033. In addition, the smart watch 200 may provide an auditory effect such as a warning sound or a haptic effect such as a vibration signal as well as a visual effect so as to attract a user's attention.

Upon checking detailed content of the third schedule information 2033 and then receiving a user input 2050 for touching and dragging the enlarged display region 2040 in a central direction of the watch image 2010, the smart watch 200 may release a reminder function for the third schedule information 2033. When a predetermined time period elapses after the detailed information 2045 is displayed, the smart watch 200 may release the reminder function for the third schedule information 2033.

Accordingly, the smart watch 200 may restore the size of the reduced watch image 2010 and the size of the enlarged display region 2040 to original sizes and move the first to fourth schedule information items 2031 to 2034 in a counterclockwise direction. In addition, the smart watch 200 may display upcoming schedule information (i.e., fifth schedule information 2035) in a right region of fourth schedule information 2034.

Figure 21:
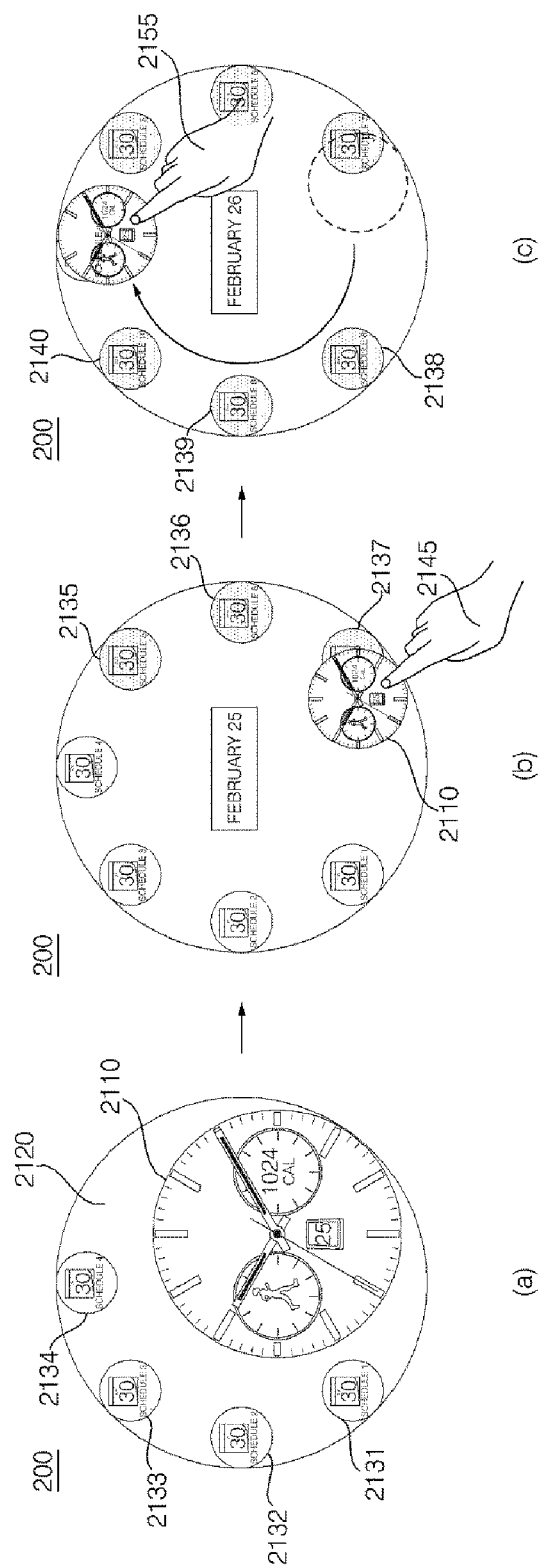
FIG. 21 is a diagram for explaining an operation of the smart watch that sequentially displays upcoming schedule information items according to a preset gesture input during a moving circle mode.

FIG. 21 is a diagram for explaining an operation of the smart watch that sequentially displays upcoming schedule information items according to a preset gesture input during a moving circle mode.

Referring to FIG. 21, the smart watch 200 may display a plurality of schedule information items 2131 to 2134 in a surrounding region 2120 of a watch image 2110 in a moving circle mode.

In this state, upon receiving a user input 2145 of touching the watch image 2110, the smart watch 200 may reduce the watch image 2110 and display fifth to seventh schedule information items (i.e., upcoming schedule information items 2135 to 2137 that were hidden by the watch image) in a right region of the display unit 251. In this case, the smart watch 200 may display the fifth to seventh schedule information items 2135 to 2137 displayed in the right region of the display unit 251 to be distinguished from the first to fourth schedule information items 2131 to 2134.

Upon receiving a user input 2155 for touching the watch image 2110 and continuously dragging the watch image 2110 clockwise, the smart watch 200 may update the schedule information items 2131 to 2133 at points where the corresponding watch image 2110 is passed through, at a period of 12 hours.

That is, if eighth to tenth schedule information items 2138 to 2140 are present in a corresponding zone after 12 hours, the smart watch 200 may update the first to third schedule information items 2131 to 2133 to the eighth to tenth schedule information items 2138 to 2140. In this case, the smart watch 200 may display the updated schedule information items 2138 to 2140 to be distinguished from the remaining schedule information items 2135 to 2137. Accordingly, the user of the smart watch 200 may rotate the watch image 2110 clockwise so as to easily check upcoming schedule information items.

Then, when the user input 2155 to the watch image 2110 is released, the smart watch 200 may restore the position and size of the watch image 2110 to an original position and size and display the first to fourth schedule information items 2131 to 2134 in an empty space 2120 of the display unit.

Figure 22:
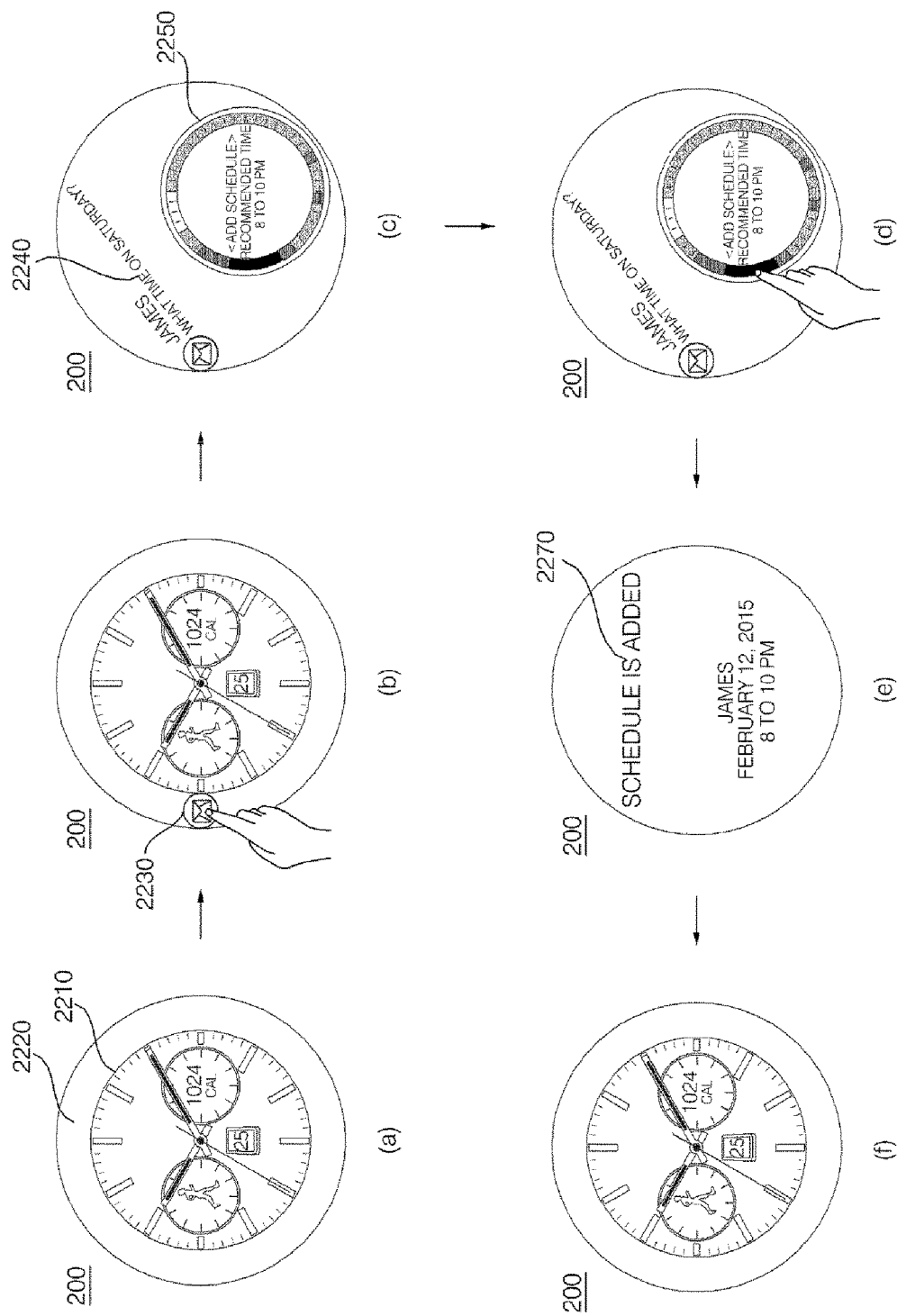
FIGS. 22 and 23 are diagrams for explanation of an operation of the smart watch for automatically recommending available schedule time of a user when a notification event associated with schedule recommendation occurs.
Figure 23:
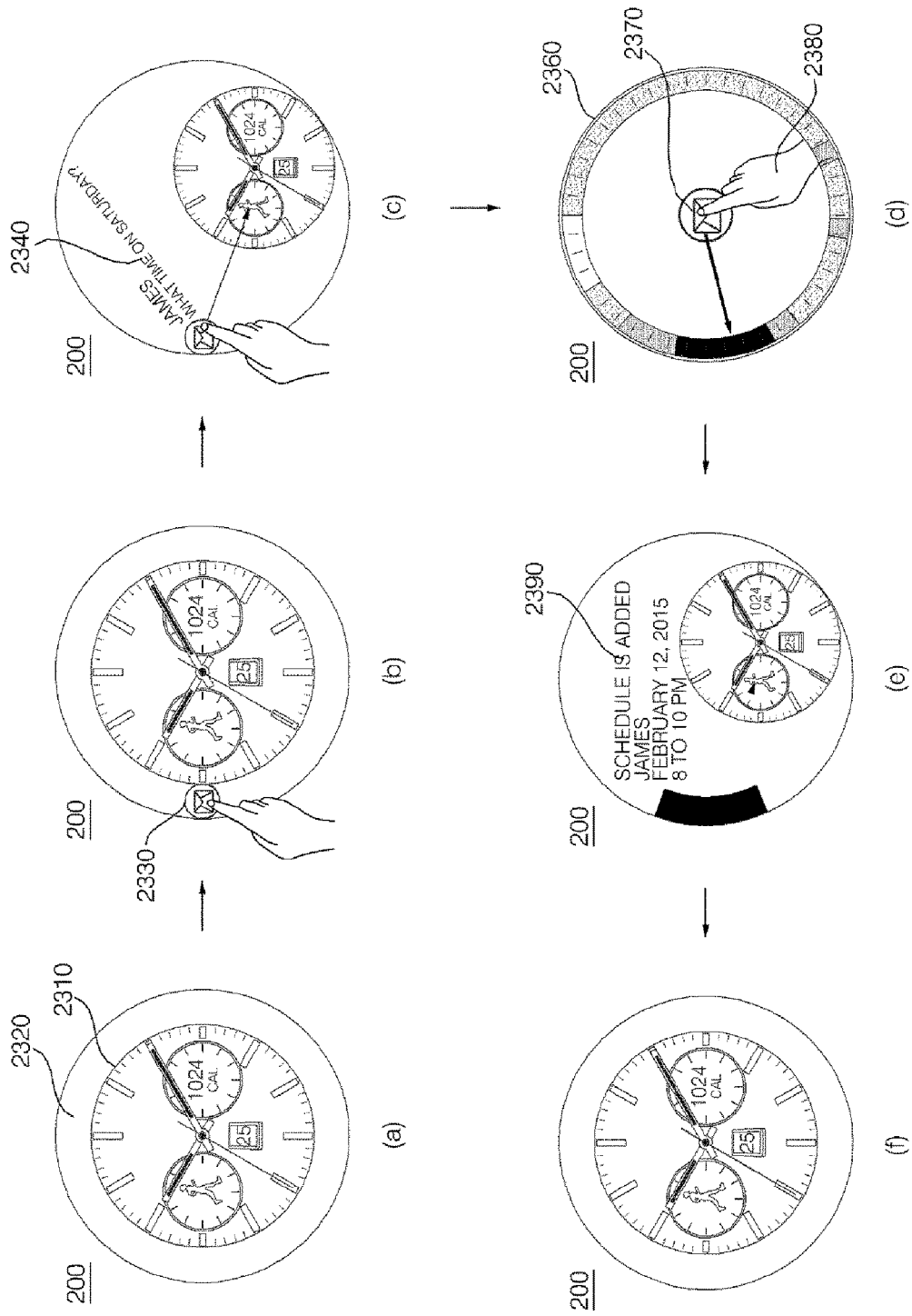

FIGS. 22 and 23 are diagrams for explanation of an operation of the smart watch for automatically recommending available schedule time of a user when a notification event associated with schedule recommendation occurs.

Referring to FIG. 22, when a predetermined notification event occurs in a moving circle mode, the smart watch 200 may display notification information 2230 corresponding to a corresponding notification event in a surrounding region 2220 of a watch image 2210.

When the notification information 2230 is selected, the smart watch 200 may move the watch image 2210 to an edge of the display unit 251, and simultaneously or sequentially change the size of the watch image 2210 according to the amount of detailed information about the notification information 2230.

The smart watch 200 may display detailed information 2240 about the notification information 2230 in an empty space 2220 of the display unit 251, which is enlarged by moving the watch image 2210 and/or changing the size of the watch image 2210.

When content of the notification information 2230 is information associated with user schedule, the smart watch 200 may convert the watch image 2210 positioned at an edge of the display unit into a time recommendation image 2250. In this case, information about available time of the user may be automatically displayed in the time recommendation image 2250.

According to another embodiment of the present invention, when a notification event associated with schedule recommendation occurs, the smart watch 200 may display the detailed information 2240 about the corresponding notification information 2230 in an empty space of the display unit without display of an image in the notification information 2230 and simultaneously convert the watch image 2210 into the time recommendation image 2250.

Upon receiving a user input 2260 for selecting a desired time zone through the time recommendation image 2250, the smart watch 200 may add a schedule associated with the notification information 2230 to the time zone selected by the user. In this case, the smart watch 200 may display feedback information 2270 indicating that the schedule is successively added to the time zone selected by the user for a predetermined time zone.

When a predetermined time period elapses after a time point at which a schedule is added, the smart watch 200 may display the original watch image 2210 in a central portion of the display unit 251 and remove the notification information 2230 to which the schedule is added by the user from the surrounding region 2220 of the watch image 2210.

According to another embodiment of the present invention, referring to FIG. 23, when a predetermined notification event occurs in a moving circle mode, the smart watch 200 may display notification information 2330 corresponding to the notification event in a surrounding region 2230 of a watch image 2310.

When the notification information 2330 is selected, the smart watch 200 may move the watch image 2310 to an edge of the display unit 251 and simultaneously change the size of the watch image 2310 according to the amount of detailed information about the notification information 2330.

The smart watch 200 may display detailed information 2340 about the notification information 2330 in an empty space 2320 of the display unit 251, which is enlarged by moving the watch image 2310 and/or changing the size of the watch image 2310.

According to another embodiment of the present invention, when a notification event associated with schedule recommendation occurs, the smart watch 200 may display the detailed information 2340 about the corresponding notification information 2330 in an empty space of the display unit and simultaneously change the position and size of the watch image 2310 without displaying the notification information 2330 on a display screen.

Upon receiving a user input 2350 for touching the notification information 2330 and then dragging the notification information 2330 in a central direction of the watch image 2310, the smart watch 200 may display a time recommendation image 2360 at an edge of the display unit 251 and display an icon 2370 corresponding to the notification information 2330 in a central portion of the display unit. In this case, information about available time of a user may be automatically displayed in the time recommendation image 2360.

Upon receiving a user input 2380 for touching the icon 2370 displayed in the central portion of the display unit and then dragging the icon 2370 in a direction of a specific time zone of the time recommendation image 2360, the smart watch 200 may add a schedule associated with the notification information 2330 to the time zone selected by the user. In this case, the smart watch 200 may display feedback information 2390 indicating that the schedule is successively added to the time zone selected by the user for a predetermined time period.

When a predetermined time period elapses after a time point at which schedule is added, the smart watch 200 may display the original watch image 2310 in a central portion of the display unit 251 and remove the notification information 2330 to which the schedule is added by the user from the surrounding region 2230 of the watch image 2310.

FIG. 24 is a diagram for explanation of an operation of a smart watch for performing a predetermined edit function based on a drag input of a user during a moving circle mode.

Referring to FIG. 24, upon entering a moving circle mode, the smart watch 200 may reduce a watch image 2410 and display the watch image 2410 in a central portion or an edge portion of the display unit 251.

The smart watch 200 may display schedule information items 2431 and 2432 preset by a user in a surrounding region 2420 of the watch image 2410. In this case, the schedule information items displayed in the surrounding region 2420 may be configured in such a way that a display position of the schedule information items varies according to schedule time. In addition, it is assumed that the schedule information items are displayed through the schedule icons 2431 and 2432, sizes of which vary in proportion to a duration between a start time and an end time of corresponding schedule.

As illustrated in (a) of FIG. 24, upon receiving a user input 2440 for touching one side of a second schedule icon 2432 and then dragging the second schedule icon 2432 clockwise, the smart watch 200 may extend schedule time by as much as the dragged distance. On the other hand, upon receiving a user input (not shown) for touching one side of the second schedule icon 2432 and then dragging the second schedule icon 2432 counterclockwise, the smart watch 200 may reduce schedule time by as much as the dragged distance.

The smart watch 200 may display information about schedule time that is adjusted in real time via a drag input in one region of the display unit 251 during reception of the user input 2440. In addition, the smart watch 200 may remove the other schedule icon 2431 from the display unit 251 while a schedule is edited according to the user input 2440.

As illustrated in (b) of FIG. 24, upon a user input 2450 for touching one point of the second schedule icon 2432 and then rotating the second schedule icon 2432 clockwise a predetermined number of times, the smart watch 200 may perform a day repeat function by a rotation number of times for corresponding schedule information.

For example, in the case of one number of times rotation, corresponding schedule information may be repeatedly set for the same time zone of the next day, and in the case of two number of times rotation, the corresponding schedule information may be repeatedly set for the same time zone of the next day and the day after the next day. In this case, at least one schedule icon 2433 corresponding to repeatedly set schedule information items may be displayed on an adjacent area of the second schedule icon 2432.

Figure 25:
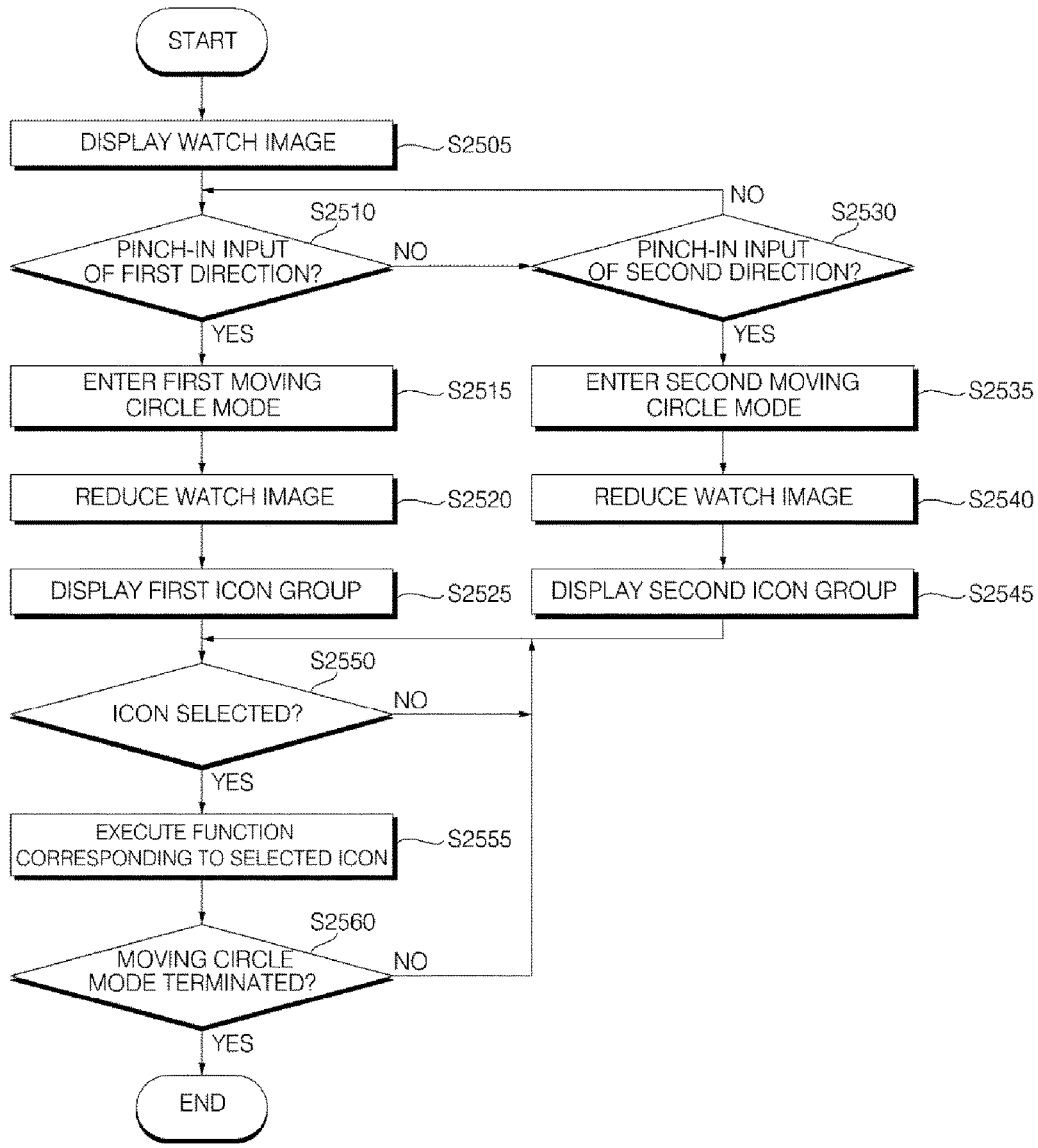
FIG. 25 is a flowchart for explaining an operation of a smart watch according to another embodiment of the present invention.

FIG. 25 is a flowchart for explaining an operation of a smart watch according to another embodiment of the present invention.

Referring to FIG. 25, the controller 280 of the smart watch 200 may display a watch image set as an initial image in the display unit 251 according to a user command and so on (S2505). In this case, the watch image displayed on the display unit 251 may be a digital watch image or an analog watch image.

When a pinch-in input having a first direction (S2510) is received on the display unit 251 while the watch image is displayed, the controller 280 may enter a first moving circle mode (S2515).

Upon entering the first moving circle mode, the controller 280 may reduce the watch image at a predetermined ratio and display the watch image on the display unit 251 (S2520). In this case, the controller 280 may display the reduced watch image in a central portion of the display unit 251.

The controller 280 may display a first icon group in an empty space of the display unit 251, which is formed by reducing the watch image (S2525). The first icon group displayed in the empty space of the display unit 251 may include various setting icons associated with the smart watch 200 or the mobile terminal 100, without being limited thereto.

Mean while, when a pinch-in input having a second direction (S2530) is received on the display unit 251 while the watch image is displayed, the controller 280 may enter second moving circle mode (S2535).

Upon entering the second moving circle mode, the controller 280 may reduce the watch image by a predetermined ratio and display the watch image on the display unit 251 (S2540). Similarly, the controller 280 may display the reduced watch image in a central portion of the display unit 251.

The controller 280 may display a second icon group in an empty space of the display unit 251, which is formed by reducing the watch image (S2545). The second icon group displayed in the empty space of the display unit 251 may include shortcut icons that are predetermined by the user or app icons that are frequently executed by the user, without being limited thereto.

The controller 280 may provide a separate menu for presetting a plurality of icons to be included in the first icon group or the second icon group.

When any one of a plurality of icons included in the first or second icon group is selected (S2550), the controller 180 may execute a function corresponding to the selected icon (S2555).

Then upon receiving a predetermined user input for terminating the first or second moving circle mode (S2560), the controller 280 may enlarge the reduced watch image and display the original watch image on the display unit 251.

When a predetermined user input for termination of the first or second moving circle mode is not received (S2560), the controller 280 may repeatedly perform the aforementioned operations 2550 and 2555. Here, the user input for termination of the first moving circle mode may be a pinch-out input having a first direction, without being limited thereto. In addition, the user input for termination of the second moving circle mode may be a pinch-out input having a second direction, without being limited thereto.

Figure 26:
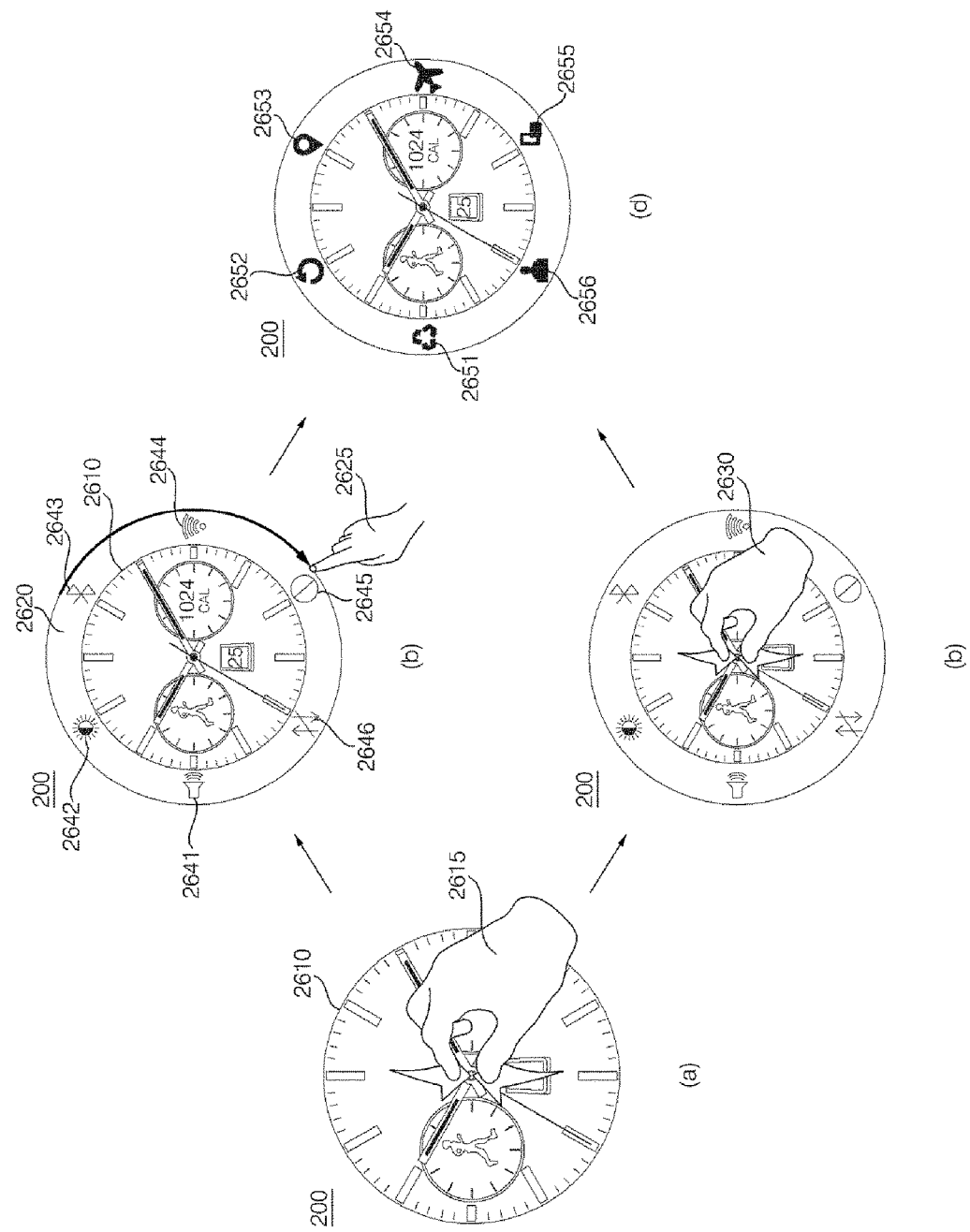
FIGS. 26 and 27 are diagrams for explaining an operation of a smart watch that enters a moving circle mode and provides a quick setting function in response to a pinch-in input having a first direction.
Figure 27:
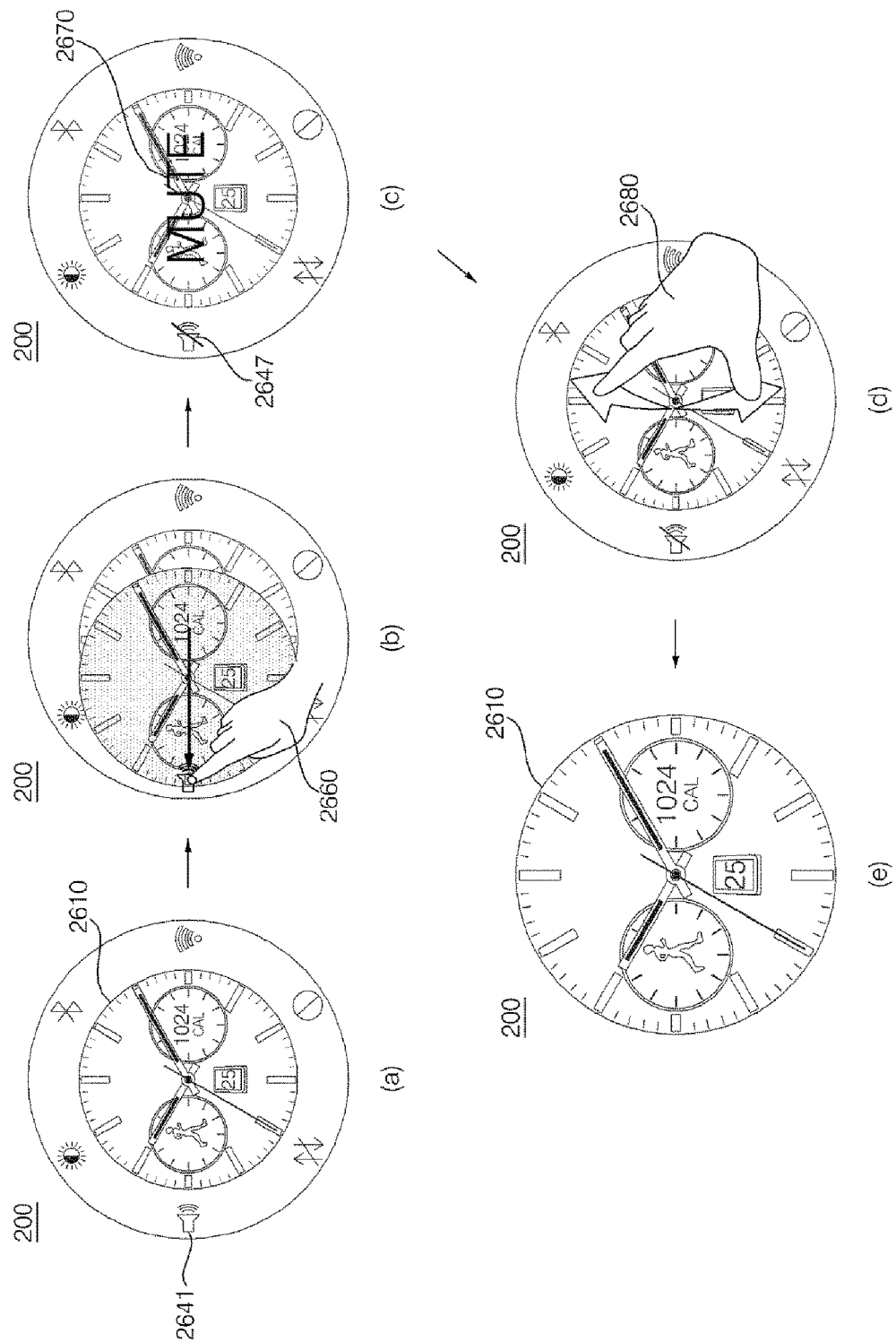

FIGS. 26 and 27 are diagrams for explaining an operation of a smart watch that enters a moving circle mode and provides a quick setting function in response to a pinch-in input having a first direction.

Referring to FIG. 26, the smart watch 200 may display a watch image 2610 on the display unit 251 according to a user command and so on.

During display of the watch image 2610, upon receiving a pinch-in input 2615 having a vertical direction, the smart watch 200 may enter a moving circle mode for performing a quick setting function.

During entry into the moving circle mode, the smart watch 200 may reduce a watch image 2610 by a predetermined ratio and display the reduced watch image in a central portion of the display unit 251. In addition, the smart watch 200 may display the first icon group in an empty space 2620 of the display unit 251, which is formed by reducing a watch image. In this case, the first icon group may include a plurality of setting icons 2641 to 2646 associated with an operation of the smart watch 200.

As illustrated in (b) and (c) of FIG. 26, upon receiving an input 2625 of touching and dragging along an edge of the display unit 251 or receiving a pinch-in input 2630 having a vertical direction through the watch image 2610, the smart watch 200 may display other setting icons belonging to the first icon group in a surrounding region 2620 of the watch image 2610.

Referring to FIG. 27, receiving a user input 2660 of touching the watch image 2610 displayed in the central portion of the display unit 251 and then dragging the watch image 2610 toward a first setting icon 2641, the smart watch 200 may directly set a function corresponding to the first setting icon 2641.

For example, when the first setting icon 2641 is a bell sound setting icon, the smart watch 200 may set a bell sound to mute according to a drag input 2660 of a user. When the bell sound is set to mute, the smart watch 200 may change the first setting icon 2641 to a second setting icon 2647.

According to another embodiment of the present invention, upon receiving a user input (not shown) of touching the first setting icon 2641 and then dragging the first setting icon 2641 toward the watch image 2610, the smart watch 200 may directly set a function corresponding to the first setting icon.

The smart watch 200 may display notification information 2670 indicating that a quick setting function is normally performed on the watch image 2610. In addition, the smart watch 200 may provide an auditory effect such as a warning sound or a haptic effect such as a vibration signal as well as a visual effect so as to attract a user's attention.

Upon receiving a pinch-out input 2680 having a vertical direction through the watch image 2610 after quick setting is completed, the smart watch 200 may terminate a moving circle mode for performing the quick setting function and display the original watch image 2610 on the display unit 251.

Figure 28:
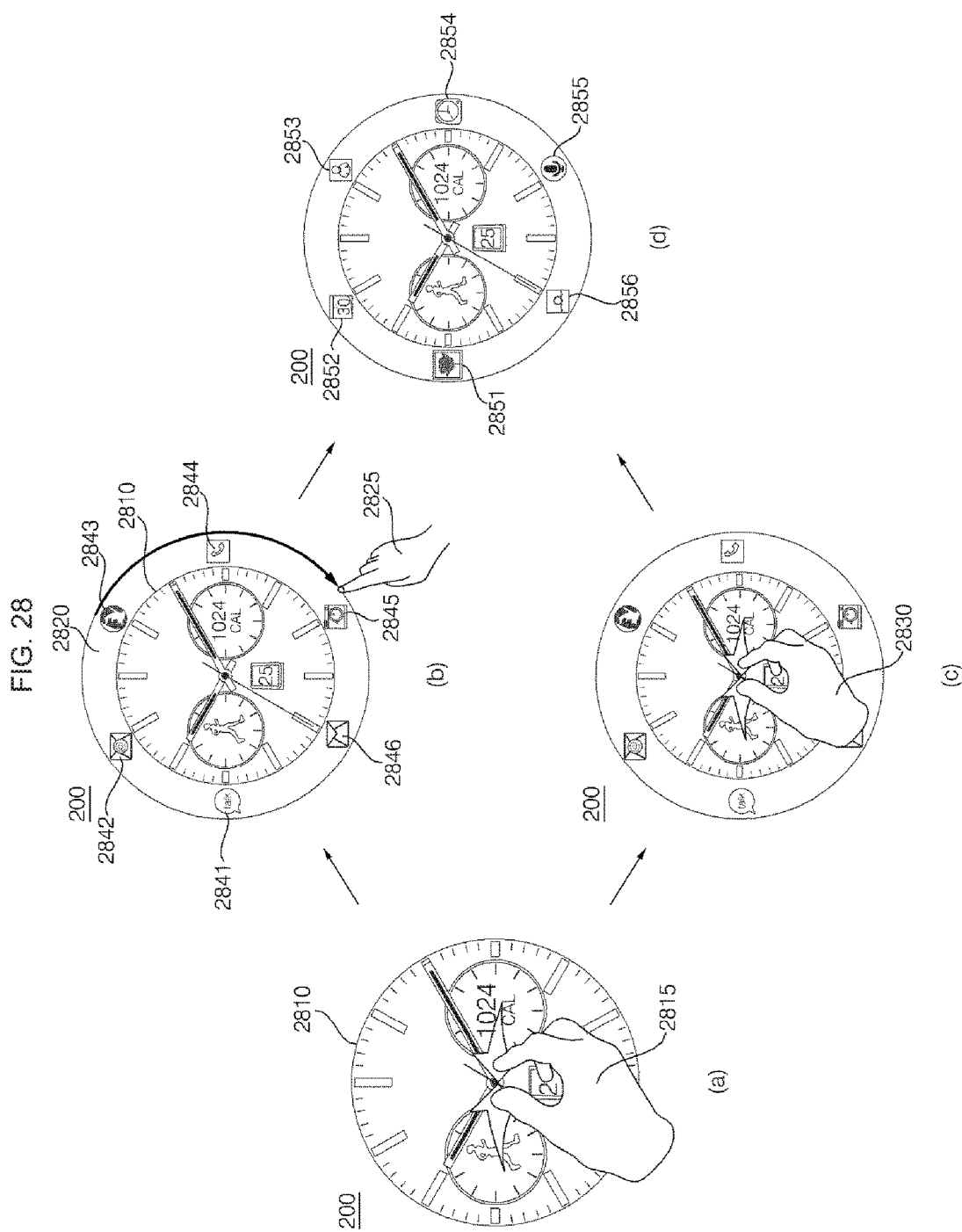
FIGS. 28 and 29 are diagrams for explaining an operation of a smart watch that enters a moving circle mode and provides a shortcut function in response to a pinch-in input having a second direction.
Figure 29:
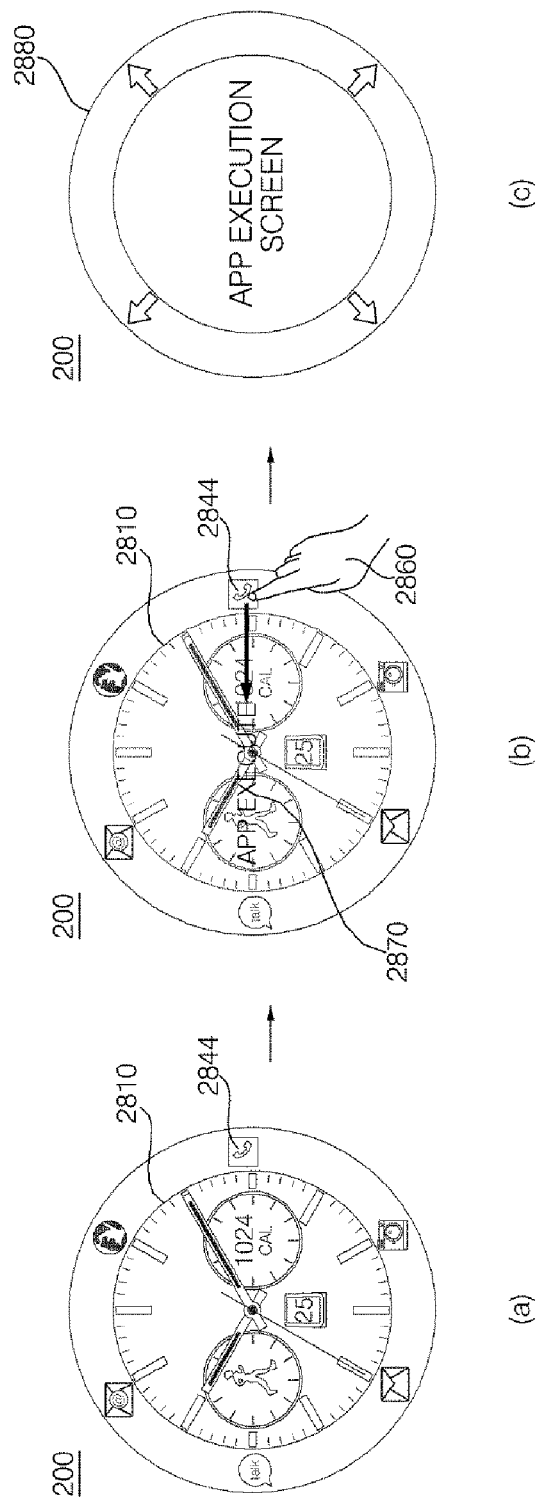

FIGS. 28 and 29 are diagrams for explaining an operation of a smart watch that enters a moving circle mode and provides a shortcut function in response to a pinch-in input having a second direction.

Referring to FIG. 28, the smart watch 200 may display a watch image 2810 on the display unit 251 according to a user command and so on.

During display of the watch image 2810, upon receiving a pinch-in input 2815 of a horizontal direction, the smart watch 200 may enter a moving circle mode for performing a shortcut function.

Upon entering a moving circle mode, the smart watch 200 may reduce a watch image 2810 by a predetermined ratio and display the reduced watch image 2810 in a central portion of the display unit 251. In addition, the smart watch 200 may display the second icon group in an empty space 2820 of the display unit 251, which is formed by reducing a watch image. In this case, the second icon group may include a plurality of app icons 2841 to 2846 that are frequently executed by a user.

As illustrated in (b) and (c) of FIG. 28, upon receiving an input 2825 of touching and dragging along an edge of the display unit 251 or receiving a pinch-in input 2830 of a horizontal direction trough the watch image 2810, the smart watch 200 may display other app icons belonging to the second icon group in a surrounding region 2820 of the watch image 2810.

Referring to FIG. 29, upon receiving a user input 2860 of touching a first app icon 2844 and then dragging the first app icon 2844 toward the watch image 2810, the smart watch 200 may directly execute an application corresponding to the first app icon 2844. That is, the smart watch 200 may execute a shortcut function with respect to an app icon 2844 selected through the user input 2860.

According to another embodiment of the present invention, upon receiving a user input (not shown) of touching the watch image 2810 display in the central portion of the display unit 251 and then dragging the watch image 2810 toward the first app icon 2844, the smart watch 200 may directly execute an application corresponding to the first app icon 2844.

The smart watch 200 may temporally display notification information 2870 indicating execution of the selected app icon 2844 on the watch image 2810. In addition, the smart watch 200 may provide an auditory effect such as a warning sound or a haptic effect such as a vibration signal as well as a visual effect so as to attract a user's attention. Then the smart watch 200 may display an execution image 2880 of an application corresponding to the first app icon 2844 on the display unit 251.

FIG. 30 is a diagram for explaining an operation of a smart watch that enters a moving circle mode and provides app icons registered as bookmarks in response to a long touch input.

Referring to FIG. 30, the smart watch 200 may display a watch image 3010 on the display unit 251 according to a user command and so on.

Upon receiving a long touch input 3015 through one point of the watch image 3010, the smart watch 200 may enter a moving circle mode for representing app icons registered as bookmarks.

Upon entering a moving circle mode, the smart watch 200 may reduce a watch image 3010 by a predetermined ratio and move the reduced watch image 3010 to be inclined in one direction. In addition, the smart watch 200 may display a plurality of app icons 3031 to 3038 in a line in an empty space 3020 of the display unit 251, which is formed by reducing and moving the watch image. In this case, a size of the app icons 3031 to 3038 may be changed according to a width of the empty space 3020 in which each icon is positioned.

Upon receiving a clockwise touch and drag input 3025 through a surrounding region 3020 of the watch image 3010, the smart watch 200 may sequentially display other app icons 3040 to 3042 registered as bookmarks in the empty space 3020 of the display unit 251. That is, if there are many app icons registered as bookmarks, a user may flick (or touch and drag) an app icon display region to rotate app icons displayed on the display unit 251.

Then as illustrated in (c) of FIG. 30, upon receiving a user input 3050 of touching a first app icon 3034 and then dragging the first app icon 3034 toward the watch image 3010, the smart watch 200 may execute an application corresponding to the first app icon 3034.

According to another embodiment of the present invention, upon receiving a user input (not shown) of touching the watch image 3010 displayed on the display unit 251 and then dragging the watch image 3010 toward the first app icon 3034, the smart watch 200 may execute an application corresponding to the first app icon 3034.

The smart watch 200 may temporally display notification information 3060 indicating an execution of a selected icon 3034 on the watch image 3010. In addition, the smart watch 200 may provide an auditory effect such as a warning sound or a haptic effect such as a vibration signal as well as a visual effect so as to attract a user's attention. Then the smart watch 200 may display an execution screen 3070 of an application corresponding to the first app icon 3034 on the display unit 251.

FIG. 31 is a diagram for explaining an operation of a smart watch that provides a call screen including a watch image when receiving a call.

Referring to FIG. 31, the smart watch 200 may display a watch image 3110 on the display unit 251 according to a user command and so on.

When a call is received from a third party while the watch image 3110 is displayed, the smart watch 200 may reduce a watch image 3110 and move the reduced watch image in a predetermined direction (e.g., the 12 o'clock direction).

In addition, the smart watch 200 may display an call accept icon 3130, a call rejection icon 3140, information 3150 of a caller who requests call, notification information 3160 indicating a call reception state, and so on in an empty space 3120 of a display unit, which is formed by reducing and moving a watch image. That is, the smart watch 200 may display a call waiting screen including the watch image on the display unit 251.

Then upon receiving a user input of touching the call accept icon 3130, the smart watch 200 may display a call connection screen 3170 on the display unit 251, as illustrated in (c) of FIG. 31. In this case, the call connection screen 3170 may include a record icon 3171, a call termination icon 3172, a dial icon 3173, caller information 3174, and so on along with the watch image 3110 position in the 12 o'clock direction.

As such, the smart watch 200 may perform an operation for call connection while maintaining a watch image during call reception.

FIG. 32 is a diagram for explaining an operation of a smart watch that provides a message screen including a watch image during message reception.

Referring to FIG. 32, the smart watch 200 may display a watch image 3210 on the display unit 251 according to a user command and so on.

During display of the watch image 3210, upon receiving a message from other terminal, the smart watch 200 may reduce the watch image 3210 and move the reduced watch image in a predetermined direction (e.g., the 12 o'clock direction).

In addition, the smart watch 200 may display a message text 3230, a reply icon 3240, a call icon 3250, and so on in an empty space 3220 of a display unit, which is formed by reducing and moving a watch image. That is, the smart watch 200 may display a message reception screen including a watch image on the display unit 251.

Then upon receiving a user input of touching the reply icon 3240, the smart watch 200 may display a message writing screen 3260 on the display unit 251, as illustrated in (c) of FIG. 32. Similarly, the message writing screen 3260 may include a watch image (not shown) positioned in the 12 o'clock direction.

As such, the smart watch 200 may perform an operation for checking a message while maintaining a watch image during message reception.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A smart watch comprising:
a display configured to display a watch image; and
a controller configured to:
cause the display to reduce a size of the watch image to a first reduced size having a first position when a preset event occurs; and
cause the display to display notification information related to an incoming event received at the smart watch at an empty area of the display resulting from reducing the size of the watch image to the first reduced size,
wherein the empty area is formed between a reduced watch image and an edge of the display, and
wherein the controller is further configured to:
cause the display to display a plurality of notification items corresponding to a plurality of incoming events arranged in a particular order along a surrounding region of the watch image at the empty area, wherein the plurality of incoming events are received at the smart watch in the particular order;

when one of the plurality of notification items is selected by a selection input, determine an amount of detailed information associated with the selected notification item;

cause the display to further reduce the size of the watch image to a second reduced size based on the determined amount of detailed information associated with the selected notification item;

cause the display to display the further reduced watch image in the second reduced size at a second position different than the first position, wherein the second position is based on a display position of the selected notification item and the determined amount of detailed information associated with the selected notification item; and cause the display to display detailed information of the selected notification item along with the further reduced clock image in the second reduced size in response to the selection input.

2. The smart watch according to claim 1, wherein the preset event corresponds to:
a gesture input comprising movement of the smart watch according to a predetermined pattern;
a gesture input comprising a touch and drag to a main body of the smart watch according to a predetermined pattern; or
a gesture input comprising a tap to the main body a predetermined number of times.

3. The smart watch according to claim 1, wherein the preset event corresponds to the incoming event received at the smart watch.

4. The smart watch according to claim 1, wherein the controller is further configured to cause the display to display the reduced watch image at a central region or an edge region of the display.

5. The smart watch according to claim 1, wherein the notification information comprises:
schedule information;
message reception notification information;
email reception notification information;
messenger reception notification information;
missed call notification information;
battery related notification information; or
update related notification information.

6. The smart watch according to claim 1, wherein the controller is further configured to cause the display to display an operation screen of an application associated with the notification information when a gesture input comprising a drag of the notification information toward the displayed watch image is received.

7. A method for controlling a smart watch, the method comprising:
displaying a watch image on a display;
reducing a size of the watch image to a first reduced size having a first position when a preset event occurs; and
displaying notification information related to an incoming event received at the smart watch at an empty area of the display resulting from reducing the watch image to the first reduced size, wherein the empty area is formed between a reduced watch image and an edge of the display, and displaying a plurality of notification items corresponding to a plurality of incoming events arranged in a particular order along a surrounding region of the watch image at the empty area, wherein the plurality of incoming events are received at the smart watch in the particular order;

when one of the plurality of notification items is selected by a selection input, determining an amount of detailed information associated with the selected notification item;

further reducing the size of the watch image to a second reduced size based on the determined amount of detailed information associated with the selected notification item;

displaying the further reduced watch image in the second reduced size at a second position different than the first position, wherein the second position is based on a display position of the selected notification item and the determined amount of detailed information associated with the selected notification item; and displaying detailed information of the selected notification item along with the further reduced clock image in the second reduced size in response to the selection input.

8. The method according to claim 7, wherein the preset event corresponds to:
a gesture input comprising movement of the smart watch according to a predetermined pattern;
a gesture input comprising a touch and drag to a main body of the smart watch according to a predetermined pattern; or
a gesture input comprising a tap to the main body a predetermined number of times.

9. The method according to claim 7, wherein the present event corresponds to the incoming event received at the smart watch.

10. The method according to claim 7, further comprising displaying the reduced watch image at a central region or an edge region of the display.

11. The method according to claim 7, wherein the notification information comprises:
schedule information;
message reception notification information;
email reception notification information;
messenger reception notification information;
missed call notification information;
battery related notification information; or
update related notification information.

12. The method according to claim 7, further comprising displaying an operation screen of an application associated with the notification information when a gesture input comprising a drag of the notification information toward the displayed watch image is received.

* * * * *